(12) United States Patent
Gahinet et al.

(10) Patent No.: US 8,467,888 B2
(45) Date of Patent: Jun. 18, 2013

(54) AUTOMATED PID CONTROLLER DESIGN

(75) Inventors: Pascal Gahinet, Hopkinton, MA (US); Rong Chen, Tolland, CT (US); Bora Eryilmaz, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 773 days.

(21) Appl. No.: 12/604,924

(22) Filed: Oct. 23, 2009

(65) Prior Publication Data

US 2010/0312364 A1  Dec. 9, 2010

Related U.S. Application Data

(60) Provisional application No. 61/184,615, filed on Jun. 5, 2009.

(51) Int. Cl.
G05B 13/04 (2006.01)
G06F 3/048 (2006.01)
G06F 17/11 (2006.01)

(52) U.S. Cl.
USPC .................................. 700/30; 700/37; 700/42

(58) Field of Classification Search
USPC ..... 700/28–32, 37, 40–43; 388/906; 318/609, 318/610; 701/42; 703/2
See application file for complete search history.

(56) References Cited

U.S. PATENT DOCUMENTS

| | | | | |
|---|---|---|---|---|
| 5,394,322 A * | 2/1995 | Hansen | ................. | 700/37 |
| 6,510,353 B1 * | 1/2003 | Gudaz et al. | ........... | 700/37 |
| 7,035,695 B2 * | 4/2006 | Boiko | ................. | 700/28 |
| 7,158,840 B2 * | 1/2007 | Jacques | ................. | 700/28 |
| 7,599,752 B2 * | 10/2009 | Chen | ................. | 700/41 |
| 7,865,254 B2 * | 1/2011 | Gahinet et al. | ........... | 700/37 |
| 7,890,198 B1 * | 2/2011 | Gahinet | ................. | 700/31 |
| 7,925,362 B2 * | 4/2011 | Lee et al. | ................. | 700/37 |
| 8,060,340 B2 * | 11/2011 | Gao et al. | ................. | 702/182 |
| 8,180,464 B2 * | 5/2012 | Gao et al. | ................. | 700/44 |
| 2010/0292813 A1 * | 11/2010 | Boiko et al. | ........... | 700/37 |
| 2012/0035747 A1 * | 2/2012 | Gao | ................. | 700/29 |
| 2012/0053705 A1 * | 3/2012 | Bensoussan | ........... | 700/37 |

OTHER PUBLICATIONS

"Notification of Transmittal of the International Search Report and the Written Opinion of the International Searching Authority, or the Declaration," International Filing Date: Mar. 30, 2010, International Application No. PCT/US2010/000940, Applicant: The Math Works, Inc., Date of Mailing: Aug. 13, 2010, pp. 1-24.
"MATLAB Programming," MATLAB & SIMULINK R2007a, The MathWorks, Inc., <http://www.mathworks.com/products/new_products/release2007a.html>, 2007, pp. 1-72.
Wang, Qing-Guo, et al., "PID Tuning With Exact Gain and Phase Margins," Elsevier Science Ltd. ISA Transactions vol. 38, 1999, pp. 243-249.

* cited by examiner

*Primary Examiner* — M. N. Von Buhr
(74) *Attorney, Agent, or Firm* — Cesari and McKenna, LLP; Michael R. Reinemann

(57) ABSTRACT

Embodiments provide techniques, computer-readable media, and devices for allowing users to perform interactive design of controllers, such as PID controllers, in a free-form modeling environment. Users can tune controllers using characteristics familiar to typical users rather than having to specify gain values for the controller, which may be difficult for a user to relate to the performance of a controller.

42 Claims, 14 Drawing Sheets

AUTOMATED PID CONTROLLER DESIGN

This application claims priority under 35 U.S.C. §119 to Provisional Patent Application No. 61/184,615, filed Jun. 5, 2009, the content of which is incorporated by reference in its entirety.

BACKGROUND INFORMATION

Modeling applications may let users create system models in a free-form environment that does not restrict the user to creating models of a certain order (e.g., a first order system model or a first order system model with time delay). Free-form environments may instead let a user create system models of almost any order and/or type. At times, users may find these free-form models difficult to work with.

For example, users may find it difficult to design controllers for system models developed in the free-form environment. Controller design may be difficult because the user may have to specify the controller in terms of certain parameters that may be non-intuitive.

Assume that the user wishes to implement a proportional integral derivative (PID) controller for a system model developed in the free-form environment. The user may have desired characteristics in mind for the controller, such as a phase margin, or a closed-loop response speed. Conventional applications may require that the user relate these desired controller characteristics to particular values for P, I and D gains that are used to design the controller. Relating desired characteristics to values of P, I, and D may prove difficult for the user because the relation of gains for P, I and D to the desired characteristics (e.g., phase margin or closed-loop response speed) is complex, nonlinear, and non-intuitive to the average user of a free-form modeling application. These difficulties may cause the user to resort to trial-and-error guesswork for values of P, I and D in the hopes that he/she eventually designs a controller that achieves an acceptable, or desired, response for the feedback system (i.e., the combination of the controller and the system).

Difficulties faced by users of free-form modeling environments when designing controllers for free-form models may discourage users from making use of free-form environments for designing certain types of controllers, such as complex controllers.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

Figure 1:
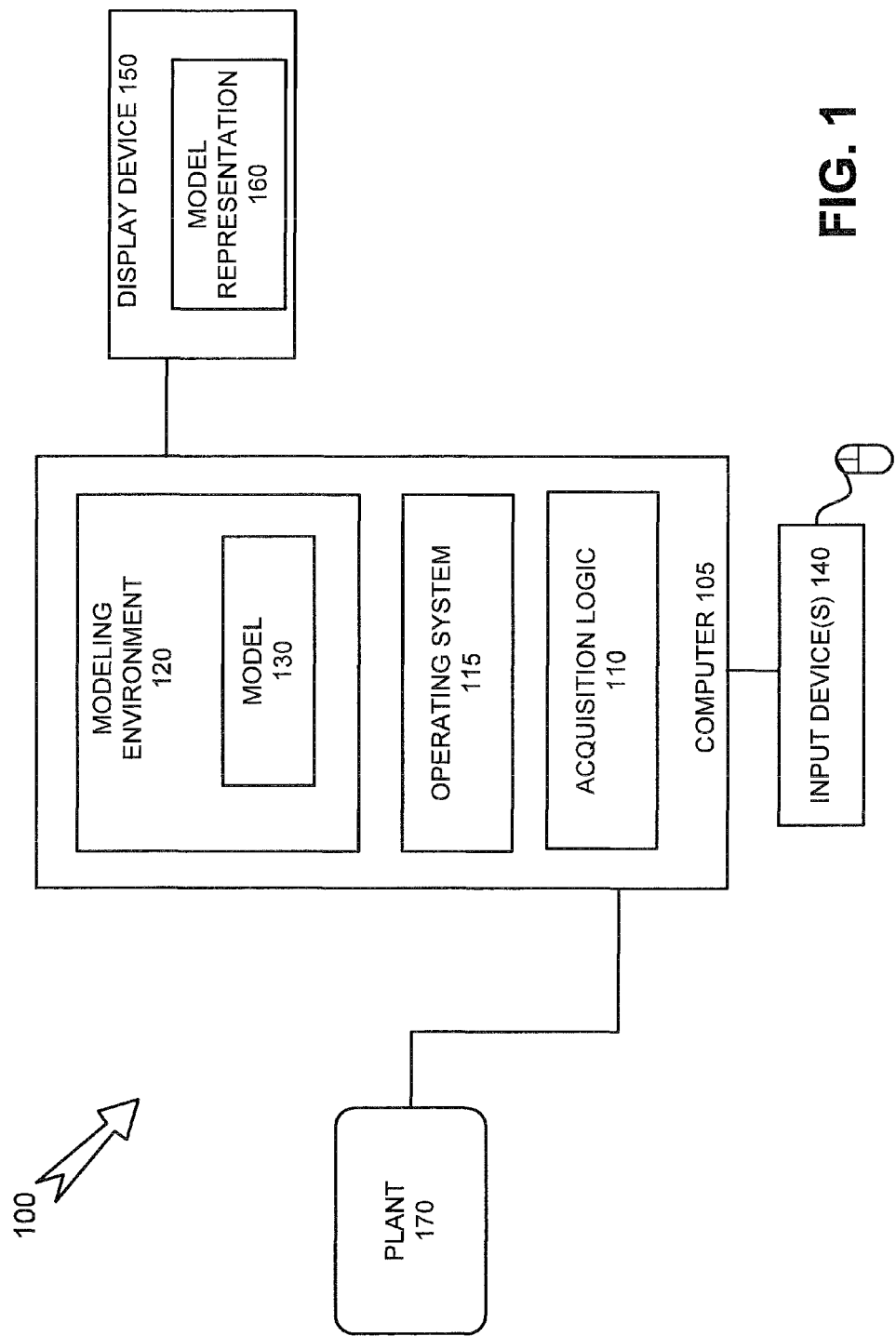
FIG. 1 illustrates an exemplary system for practicing an embodiment of the invention.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Exemplary embodiments include methods, computer-readable media, and apparatuses for tuning proportional integral (PI) and proportional integral derivative (PID) controllers. Embodiments allow a user to specify controller performance specifications using tuning parameters familiar to the average user, such as, but not limited to, closed-loop response speed, closed-loop bandwidth, phase margin, etc. These performance specifications differ from tuning parameters used for the controller, such as P, I and D gains. Allowing a user to use performance specifications to design a controller can facilitate intuitive interaction between a user and a controller design application, such as a controller toolbox, that operates with a free-form modeling environment.

An embodiment of the invention allows the user to design a controller without having to manually determine and/or tune P, I, and D gains for the controller. For example, an implementation may operate from the open-loop frequency response and can work with a single-input single-output (SISO) loop representation for a system. Other embodiments can work with multiple input multiple output (MIMO) systems when the systems are sequentially processed one loop at a time. The embodiment can work without restriction on a plant order or presence of time delays in the plant. For example, a user may design a PID controller that achieves a performance objective, such as a desired bandwidth and/or phase margin, while satisfying a robustness index (e.g., overshoot, gain margin, etc.) defined by the user. The user may achieve the objective by specifying parameters like the closed loop bandwidth and phase margin. In contrast, conventional approaches may require that the user try values for P, I, and D until the user eventually obtains satisfactory performance.

Another embodiment may provide the user with a graphical user interface (GUI) that includes input mechanisms (e.g., sliders) that allow the user to change phase margin, closed loop bandwidth, and/or response speed as the controller executes. The embodiment may display response curves, e.g., amplitude vs. time curve, as the user manipulates the input mechanisms, thereby supporting interactive controller design.

Embodiments can also support code generation, whereby executable code for controllers can be generated. For example, a user may define a PID controller for a fuel injection system used in an automobile. The user may generate code, e.g., C++ code, that implements the controller and may transfer the code to a processing device that will implements the controller in the automobile (e.g., an embedded controller in the automobile).

Exemplary System

FIG. 1 illustrates an exemplary system 100 for practicing an embodiment. System 100 may be used to construct a model that includes one or more entities, to design and implement a PID controller for the model, and/or to generate code for the controller. System 100 may include computer 105, acquisition logic 110, operating system 115, modeling environment 120, model 130, input device 140, display device 150 model representation 160, and plant 170. The system in FIG. 1 is illustrative and other embodiments of system 100 can include fewer devices, more devices, and/or devices in configurations that differ from the configuration of FIG. 1.

Computer 105 may include a device that performs processing operations, display operations, communication operations, etc. For example, computer 105 may include logic, such as one or more processing or storage devices, that can be used to perform and/or support processing activities on behalf of a user. Embodiments of computer 105 may include a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or to generate one or more results.

Computer 105 may further perform communication operations by sending data to or receiving data from another device (not shown in FIG. 1). Data may refer to any type of machine-readable information having substantially any format that may be adapted for use in one or more networks and/or with one or more devices. Data may include digital information or analog information. Data may further be packetized and/or non-packetized.

Acquisition logic 110 may acquire data from devices external to computer 105 and may make the data available to computer 105. For example, acquisition logic 110 may include analog-to-digital converters, digital-to-analog converters, filters, multiplexers, etc., which are used to make data available to computer 105. Computer 105 may use acquired data to perform modeling operations, PID controller design activities, etc.

Operating system 115 may manage hardware and/or software resources associated with computer 105. For example, operating system 115 may manage tasks associated with receiving user inputs, operating computing environment 105, allocating memory, prioritizing system requests, etc. In an embodiment, operating system 115 may be a virtual operating system. Embodiments of operating system 115 may include Linux, Mac OS, Microsoft Windows, Solaris, UNIX, etc. Operating system 115 may further run on a virtual machine, which can be provided by computer 105.

Modeling environment 120 may provide a computing environment that allows users to perform simulation or modeling tasks related to disciplines, such as, but not limited to, mathematics, science, engineering, medicine, business, etc. Modeling environment 120 may support one or more applications that execute instructions to allow a user to construct a model having executable semantics. For example, in an embodiment, modeling environment 120 may allow users to create free-form models (e.g., first, second, third, fourth, fifth, etc., order models) having executable semantics. Modeling environment 120 may further support time-based, event-based, etc., modeling activities.

Model 130 may include information for a textual or graphical model. For example, model 140 may include information for textual models or a graphical models that can be time-based models, event-based models, state transition models, data flow models, component diagrams, entity flow diagrams, equation based language diagrams, etc. Graphical embodiments of model 130 may include entities (e.g., blocks, icons, etc.) that represent executable code for performing operations. Code for the entities may be executed to perform a simulation using the model. Entities may be connected together using lines that represent pathways for transferring data from one entity to another in the model.

Input device 140 may receive user inputs. For example, input device 140 may transform a user motion or action into a signal or message that can be interpreted by computer 105. Input device 140 can include, but is not limited to, keyboards, pointing devices, biometric devices, accelerometers, microphones, cameras, haptic devices, etc.

Display device 150 may display information to a user. Display device 150 may include a cathode ray tube (CRT), plasma display device, light emitting diode (LED) display device, liquid crystal display (LCD) device, etc. Embodiments of display device 150 may be configured to receive user inputs (e.g., via a touch sensitive screen) if desired. In an embodiment, display device 150 can display one or more graphical user interfaces (GUIs) to a user. The GUIs may include model 140 and/or other types of information.

Model representation 160 may include a visual representation provided by model 130. For example, model representation 160 may be displayed to a user and may include a number of entities connected by lines. When model 130 is executed, model representation 160 may change to show, for example, the flow of data through the model.

Plant 170 may include one or more devices that provide data to computer 105. For example, plant 170 may include an engine system that is monitored using sensors, such as accelerometers, thermocouples, opto-electric transceivers, strain gauges, etc. In an embodiment, acquisition logic 110 may receive signals from plant 170 in analog or digital form and may transform the signals into a form suitable for use in computer 105.

Exemplary Modeling Environment

Figure 2:
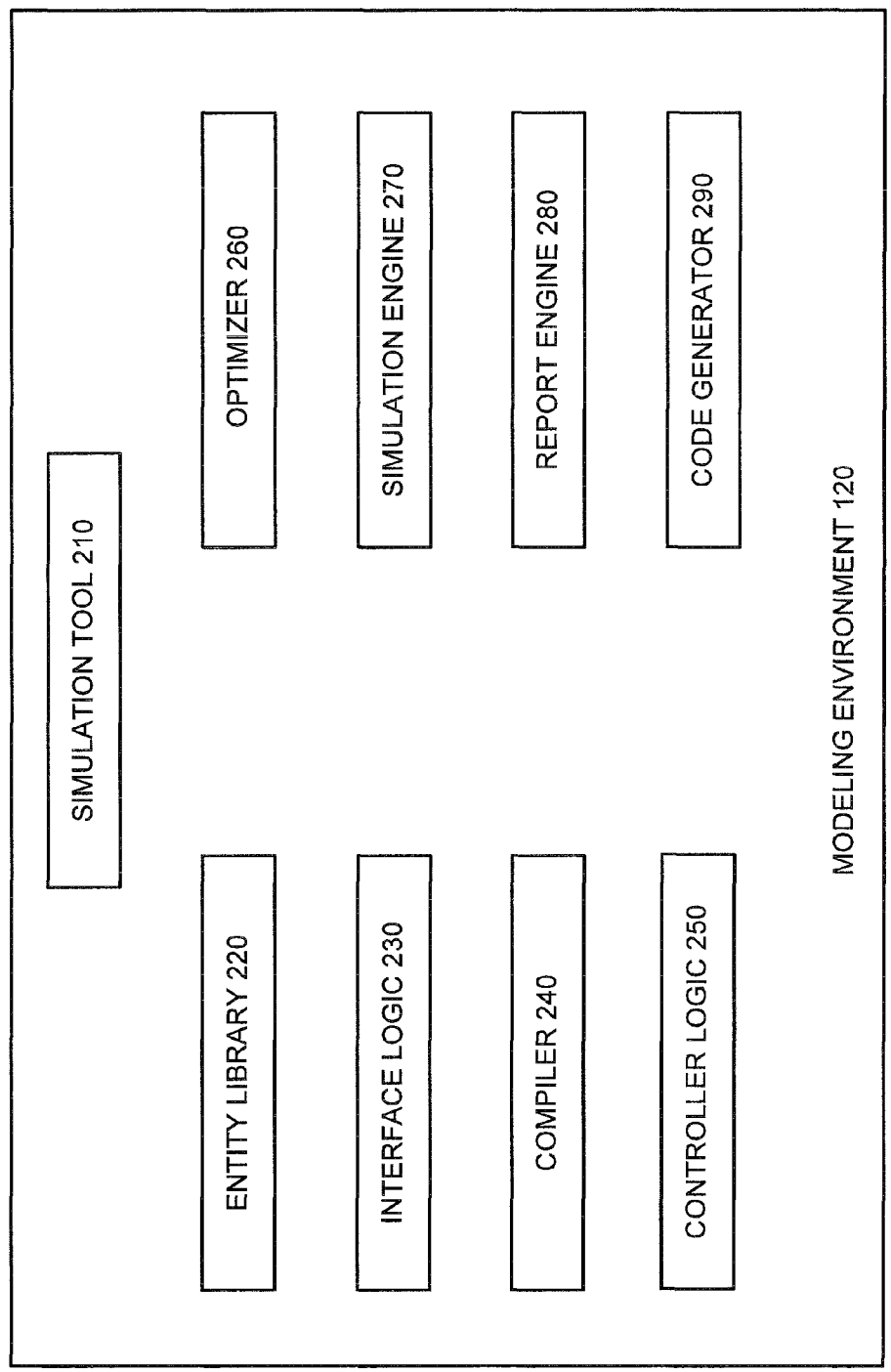
FIG. 2 illustrates an exemplary functional diagram for practicing an embodiment of the invention.

FIG. 2 illustrates an exemplary embodiment of a modeling environment 120. Modeling environment 120 can include simulation tool 210, entity library 220, interface logic 230, compiler 240, controller logic 250, optimizer 260, simulation engine 270, report engine 280, and code generator 290. The embodiment of modeling environment 120 illustrated in FIG. 2 is illustrative and other embodiments of modeling environment 120 can include more entities or fewer entities without departing from the spirit of the invention.

Simulation tool 210 may be an application for building a model. Simulation tool 210 can be used to build a textual model or a graphical model having executable semantics. In the case of graphical models, simulation tool 210 may allow users to create, modify, diagnose, delete, etc., model entities and/or connections. Simulation tool 210 may interact with other entities illustrated in FIG. 1 or 2 for receiving user inputs, executing a model, displaying results, generating code, etc.

Entity library 220 may include code modules or entities (e.g., blocks/icons) that a user can drag and drop into a display window that includes model representation 160. In the case of graphical models, a user may further couple entities using connections to produce a graphical model of a system, such as plant 170.

Interface logic 230 may allow modeling environment 120 to send or receive data and/or information to/from devices (e.g., a target environment) or software modules (e.g., an application program interface). In an embodiment, interface logic 230 may interface acquisition logic 110 with modeling environment 120.

Compiler 240 may compile a model into an executable format. Compiled code produced by compiler 240 may be executed on computer 105 to produce a modeling result. In an embodiment, compiler 240 may also provide debugging capabilities for diagnosing errors associated with the model.

Controller logic 250 may be used to create and implement controllers in model 130. For example, controller logic 250 may provide functionality for entities that represent types of controllers in model representation 160. When a model executes, controller logic 250 may perform control operations on the model by interacting with entities in model representation 160. In an embodiment, controller logic 250 may include control algorithms that implement controllers (e.g., PID controllers) in model representation 160. Embodiments of controller logic 250 may be configured to operate in standalone or distributed implementations.

Optimizer 260 may optimize code for a model. For example, optimizer 260 may optimize code to cause the code to occupy less memory, to cause the code to execute more efficiently, to cause the code to execute faster, etc., than the code would execute if the code were not optimized. Optimizer 260 may also perform optimizations for controller logic 250, e.g., to optimize parameters for a controller. In an embodiment, optimizer 260 may operate with or may be integrated into compiler 240, controller logic 250, code generator 290, etc.

Simulation engine 270 may perform operations for executing a model to simulate a system. Simulation engine 270 may be configured to perform standalone or remote simulations based on user preferences or system preferences.

Report engine 280 may produce a report based on information in modeling environment 120. For example, report engine 280 may produce a report indicating whether a PID controller satisfies design specifications, a report indicating whether a controller operates in a stable manner, a report indicating whether a model compiles properly, etc. Embodiments of report engine 280 can produce reports in an electronic format for display on display device 150, in a hardcopy format, and/or a format adapted for storage in a storage device.

Code generator 290 can generate code from a model. In an embodiment, code generator 290 may receive code in a first format and may transform the code from the first format into a second format. In an embodiment, code generator 290 can generate source code, assembly language code, binary code, interface information, configuration information, performance information, task information, etc., from at least a portion of a model. For example, code generator 290 can generate C, C++, SystemC, Java, Structured Text, etc., code from the model.

Embodiments of code generator 290 can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), etc.). In an embodiment, optimizer 270 can interact with code generator 290 to generate code that is optimized according to a parameter (e.g., memory use, execution speed, multi-processing, etc.).

Embodiments of the invention may be used to interactively design controllers for use in non-linear models of substantially any order and/or delay. Embodiments can be configured to use exact linearization techniques to produce linear time invariant models that can represent at least a portion of a non-linear model.

Exemplary Model Representation

Figure 3:
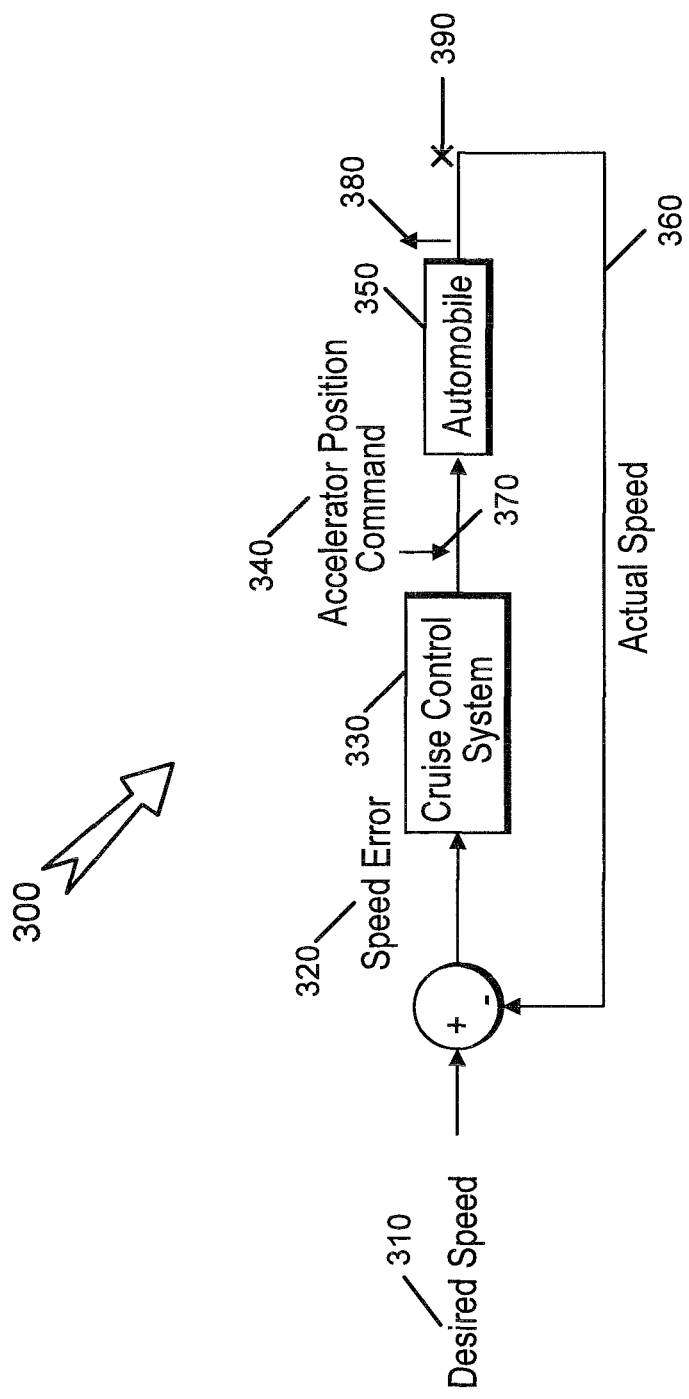
FIG. 3 illustrates an exemplary representation of a model.

FIG. 3 illustrates an exemplary representation of a model 300. Model 300 illustrates a system for controlling the speed of a vehicle traveling at a desired speed 310, which may be a user defined speed. In model 300, a cruise control system 330 may be designed for automobile 350. A desired speed 310 and an actual speed 360 are compared to arrive at speed error 320. Speed error 320 may be input to cruise control system 330, and cruise control system 330 may adjust the automobile's speed. Cruise control system 330 is in communication with accelerator position command 340 to set the position of the accelerator pedal, thus adjusting the speed of automobile 350. Automobile 350 can provide output feedback, through the speedometer, in the form of actual speed 360 for comparison, again, with desired speed 310.

In FIG. 3, actual speed 360 is a signal referred to as a feedback signal. Actual speed 360 is used to compute speed error 320, which is the difference between the desired speed 310 and actual speed 360. Cruise control system 330 is designed to respond to speed error 320 and compute an accelerator position command 340 to change the speed of automobile 350.

Designing cruise control system 330 may require that the behavior of automobile 350 is known. Successful design of cruise control system 330 may further require an understanding of how the position of the accelerator pedal affects the speed of automobile 350 over time. An accurate understanding of the behavior of the automobile 350 may allow for the design of a robust cruise control system 330. In some situations, a behavior of the automobile can be captured in a system model.

In some cases, such as the cruise control system, accurate models of physical systems require very complex descriptions. For example, the automobile may be nonlinear system, for which analysis and control design techniques may be unavailable. For example, users wishing to simulate the non-linear automobile may need to use approximations to numerically represent the automobile. By way of example, the non-linear automobile model may be approximated using techniques, such as linearization. Linearization may be applied to a single portion of the automobile model (e.g., to an operating point) or to several portions of the automobile model. When linearization is applied to multiple portions of a model, the approximations may be combined using gain scheduling techniques by combining linearized models obtained at various operating inputs to arrive at an approximation for the automobile model.

Still referring to FIG. 3, when model 300 is linearized over a portion of the model, linearization points may be selected. For example, a first linearization point may be identified using icon 370 and a second linearization point may be identified using icon 380. Linearization points 370 and 380 may be used to identify a portion of model 300 to be linearized. Embodiments, may allow a user to select linearization points 370, 380 or they may be programmatically determined (e.g., without user input). An open loop point 390 may be specified and may indicate an opening, or break, in feedback loop 360. Breaking feedback loop 360 may aid in linearizing a portion of model 300. For example, icons 370, 380, and 390 can be used to specify the linearization of the automobile model alone, i.e., without the closed-loop and the controller.

When linearization points 370, 380 and open loop point 390 are selected, an operating point may be selected. The operating point may be a point around which model 300 is linearized and may define the state of model 300 at a particular time.

For example, in a model of a car engine, the operating points are typically described by variables such as engine speed, throttle angle, engine temperature, and the surrounding atmospheric condition. The behavior or what is typically known as the "dynamics" of the model, is generally affected by the values of the operating points. For example in a car, the behavior of an engine can greatly vary if the car is being operated in the high elevations or the low elevations. In this case the elevation is part of an operating point for the car engine. A linear model is an approximation that may be valid in a small region around the operating point of the system. Near the operating point the approximation may be good, while far away the approximation may be poor. A linear model of a car being operated at 3000 ft. will be very accurate at elevations close to 3000 ft. but less accurate as the car travels at, for example, sea level.

Figure 4:
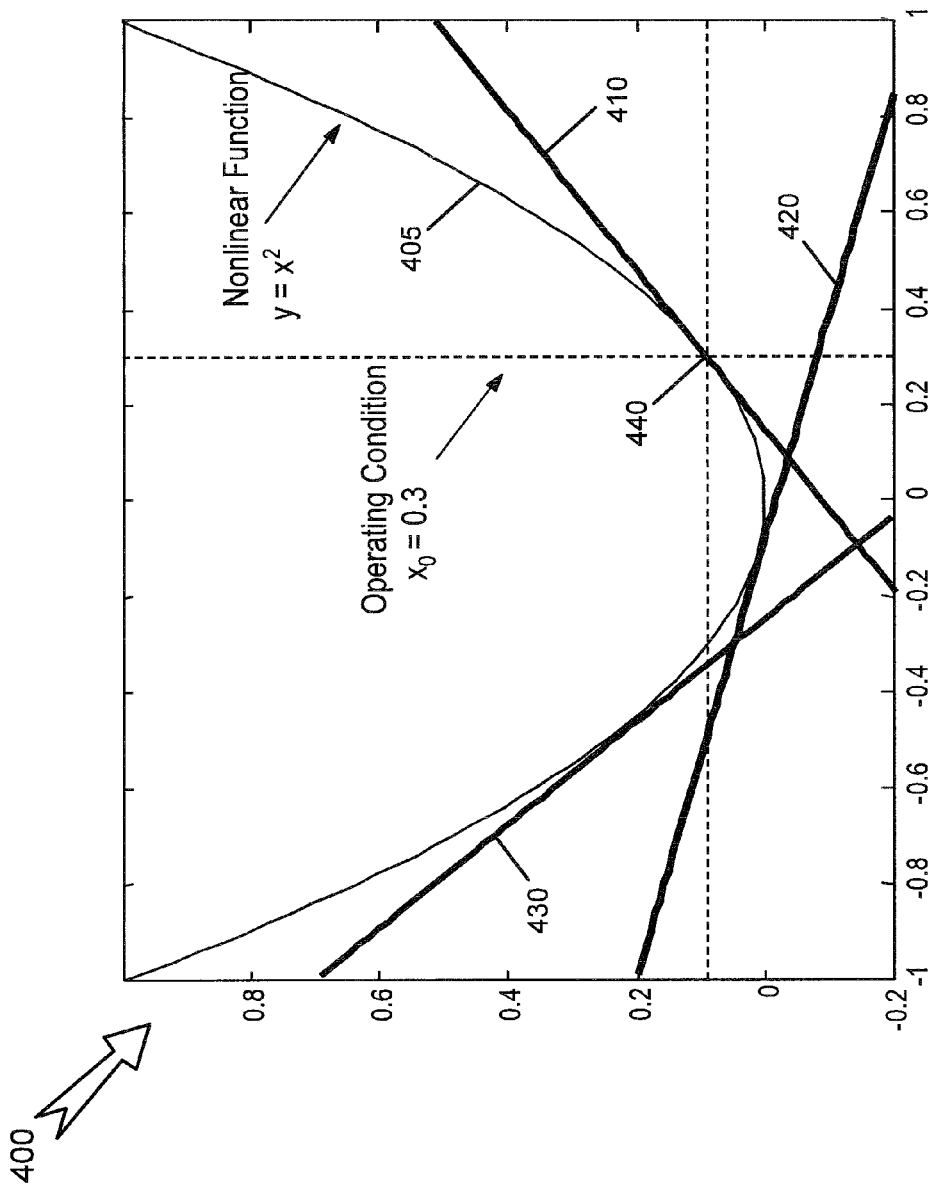
FIG. 4 illustrates an exemplary approximation technique for linearizing nonlinear models.

An example showing a linear approximation technique applied to a non-linear function is shown in FIG. 4.

FIG. 4 illustrates an operating point 440 with an exemplary non-linear function 405 indicated as $y=x^2$. If the linear approximation 410 is picked to be at $x=0.3$, the original function may be approximated as $y \approx 0.09+0.6(x-0.3)$. This linear approximation 410 is the equation of a straight line. The original function is intersected by the linear approximation at $x=0.3$. In the region about $x=0.3$, the approximation is very accurate; however, when x moves further away from $x=0.3$, the approximation becomes very poor. In general, for the linearization of a complex physical system, the approximation is accurate near the selected operating point. Therefore the specification of the operating point directly determines the result given by linearization.

In some implementations a single linear approximation, e.g., approximation 410, may be used to represent a nonlinear system. In other situations, two or more linear approximations may be used to represent portions of the nonlinear system. For example, approximation 410, approximation 420, and approximation 430 may be used to approximate nonlinear function 405 at three operating points. Controllers designed for these three operating points can be combined using gain scheduling techniques to arrive at an overall controller for the nonlinear system.

Exemplary Control Technique

Figure 5:
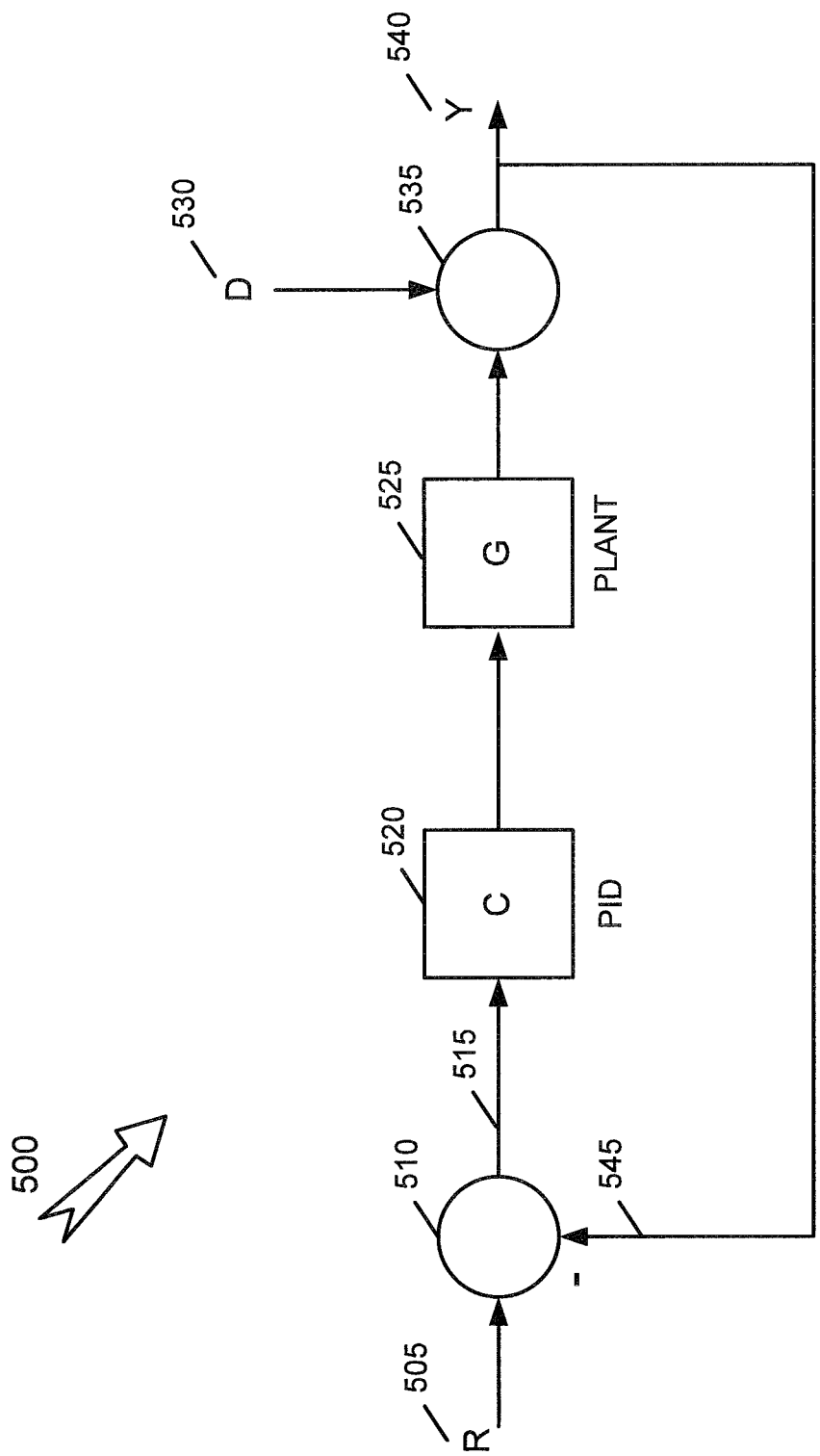
FIG. 5 illustrates a general representation of a model that can include a controller consistent with the principles of the invention.

A technique for implementing embodiments of the invention is provided below. A generalized representation of a system having a single-input single-output (SISO) feedback loop is illustrated in FIG. 5. For example, the system of FIG. 5 can be a generalized representation of the automobile cruise control system of FIG. 3. In FIG. 5, PID controller 520 can represent cruise control system 330 and plant 525 can represent automobile 350.

In the implementation of FIG. 5, plant 525 may be a linear, time invariant model, controller 520 may be a PID controller, signal R 505 may represent a reference signal, signal 515 may represent an error signal that can be represented as e=r−y, signal D 530 may represent a output disturbance, and signal Y 540 may represent an output.

When designing controller 520, a user may have objectives that controller 520 should achieve when operating with plant 525. For example, a user may specify a closed-loop stability, a zero steady-state error, a response time (e.g., that a response y to a step input r or d rises and settles within a determined interval), a robustness requirement (e.g., that a step response has small overshoot and the gain and phase margins are sufficiently large, such as 6 dB gain margin and 45 degrees phase margin).

A standard continuous-time PID controller having tunable parameters P, I, D, and N can be represented by:

$$C(s) = P + \frac{I}{s} + \frac{Ds}{1+s/N} \quad \text{(Eq. 1)}$$

A user applying conventional techniques to design a PID controller that meets design objectives, such as the ones identified above, may need to find P, I, D and N, where N represents the frequency range where the derivative term is active, or, in (1+s/N) form, it represents the pole location of the derivative filter. Determining four parameters for a controller may require computationally intensive searches of, for example, a four dimensional (4D) space. For example, searching a 4D space for P, I, D, and N, where each dimension includes 100 data search points, would require testing $100^4$ (100,000,000) data points. As a result, 4D searches may too slow to support interactive applications, such as an application that allows a user to interactively design a PID controller for a model.

Exemplary embodiments can facilitates rapid tuning of the PID parameters so that interactive PID design applications can be supported. In fact, embodiments can operate in real-time such that a user can modify an input and immediately (i.e., without a delay that inconveniences a typical user) see a display reflecting the modified controller. For example, in an embodiment $\omega_c$, which is the frequency where the gain of the open-loop response L=GC first crosses the 0 dB line, can be fixed. In the embodiment, $\omega_c$ is directly related to the closed loop bandwidth, which is in turn directly related to the speed of response for the controller. The embodiment can also fix $\theta_m$, which is the desired phase margin at the crossover frequency. $\theta_m$ may also partially control the amount of overshoot associated with the controller. The embodiment can further allow for adjusting $\omega_c$ for a given phase margin target $\theta_m$, or for adjusting $\theta_m$ for a given crossover frequency target $\omega_c$.

Once $\omega_c$ and $\theta_m$ are selected, two remaining parameters for the PID controller can be tuned by parameterizing PIDs with a gain crossover frequency at $\omega_c$ and a phase margin $\theta_m$ at $\omega_c$. The parameterization can be written as:

$$C(s) = \frac{\omega_c}{s}\left(\frac{\sin\varphi_z s + \omega_c \cos\varphi_z}{\omega_c}\right)\left(\frac{\sin\beta s + \omega_c \cos\beta}{\sin\alpha s + \omega_c \cos\alpha}\right) \quad \text{(Eq. 2)}$$

where the angles $\varphi_z$, $\alpha$, and $\beta$ vary between 0 and 90 degrees. A total phase shift contributed by the PID at the frequency $\omega_c$ is given by:

$$\Delta\varphi = \varphi_z + \beta - \alpha \quad \text{(Eq. 3)}$$

Exemplary embodiments are adapted for implementing the disclosed control techniques in computing devices. These embodiments may require that equations be represented in discrete-time representations to implement the equations on a computing device. For example, the parameterization of Eq. 2 can be rewritten in a discrete-time representation as:

$$C(z) = \frac{2\sin\frac{\omega_c T_s}{2}}{z-1}\left(\frac{\sin\varphi_z z - \sin(\varphi_z - \omega_c T_s)}{\sin\omega_c T_s}\right)\left(\frac{\sin\beta z - \sin(\beta - \omega_c T_s)}{\sin\alpha z - \sin(\alpha - \omega_c T_s)}\right) \quad \text{(Eq. 4)}$$

where $T_S$ denotes the sampling time. In Eq. 4, the parameterization allows for PIDs with real zeros and free parameters that are the angles $\alpha$ and $\beta$. Still referring to Eq. 4, C is a product of three factors having unit gain at $\omega_c$, where the first factor is the integral action, the second factor captures the phase lead contributed by the P and I terms, and the third factor captures the additional phase lead contributed by the D and N terms. In Eq. 4, the third factor is a lead network with one real zero and one real pole when $0<\alpha<\beta<90$. The third factor can also contribute some phase lag when $\beta<\alpha$. In an embodiment, the third factor can be eliminated to produce a unique PI controller having a gain crossover at $\omega_c$ and a phase margin $\theta_m$ at $\omega_c$. Omitting the first factor yields a parameterization of PD controllers (no integral action), and omitting the second factor amounts to zeroing out the P term (proportional action). Consequently, the technique described herein can be used to tune any specialization of PIDN controllers, such as P, PI, PD, and ID.

Adequate values for $\alpha$ and $\beta$ can be selected for use with exemplary embodiments when certain conditions or assumptions are satisfied. For example, adequate values for $\alpha$ and $\beta$ can be selected when $\omega_c$ is the first gain crossover, a speed of response is a function of $\omega_c$, and $\omega_c$ is selected to meet performance goal objectives (e.g., closed-loop stability and adequate robustness).

When closed-loop stability and adequate robustness are used to select adequate values for $\alpha$ and $\beta$, practical difficulties can be encountered. For example, testing closed-loop stability can be computationally intensive (i.e., computationally expensive) when performed by explicitly computing the closed-loop poles. And, ranking the merit of each $\alpha$, $\beta$ design can be difficult because desired features (e.g., a small overshoot, absence of ringing, fast settling time, etc.) can be hard to quantify and/or may require computing closed-loop step responses, which are also typically computationally intensive operations.

An exemplary embodiment avoids shortcomings associated with conventional techniques by using frequency-domain information (e.g., the open-loop Bode response) to enforce selected design objectives and to produce consistent controller designs. One reason that exemplary embodiments can promptly evaluate $\alpha$, $\beta$ designs with respect to stability and robustness is that the open-loop Bode response used in exemplary embodiments is not computationally intensive (i.e., computationally inexpensive) to compute (e.g., as compared to computing closed-loop step responses, testing closed-loop stability, etc.). These computationally inexpensive calculations provide improved speed as compared to conventional techniques. These speed improvements allow exemplary embodiments to support typical user workflows, such as interactive PID evaluation and tuning operations in substantially real-time (e.g., without delays that inconvenience a typical user).

Exemplary embodiments can support interactive workflows by employing a technique that reinterprets the Nyquist criterion to assess closed-loop stability from the open-loop Bode response. For example, the Nyquist stability test can be characterized by letting:

L(s) be the open-loop transfer function and letting P be the number of unstable (right-half-plane) poles of L(s);

$\phi(\omega)$ be any continuous representation of the phase of L(j$\omega$) in radians;

$(\omega_0, \omega_1, \ldots, \omega_k)$ be the ordered set of gain crossover frequencies where $|L(j\omega)|=1$, with the convention that k is even when the gain of L(j$\omega$) is decreasing at $\omega_k$ (i.e., the sequence starts at $\omega_1$ when the DC gain is less than 1);

$(\phi_0, \phi_1, \ldots, \phi_k)$ be the values of $\phi(\omega)$ at the frequencies $(\omega_0, \omega_1, \ldots, \omega_k)$;

$m_0$ and $m_\infty$ be the slopes of L(s) near 0 and infinity (e.g., L(s)/$s^{m_0}$ is finite as s→0);

$\delta_0$ be 1 if $|L(0)|>1$ and 0 otherwise; and $\delta_\infty$ be 1 if $|L(\infty)|>1$ and 0 otherwise.

When the above conditions are met, the closed-loop transfer function 1/(1+L(s)) is stable if and only if $$2\left(\sum_k (-1)^k \mu(\varphi_k)\right) = P + \frac{\delta_0}{\pi}\left(\varphi(0) - m_0\frac{\pi}{2}\right) - \frac{\delta_\infty}{\pi}\left(\varphi(\infty) - m_\infty\frac{\pi}{2}\right) \quad \text{(Eq. 5)}$$

where $\mu(\cdot)$ is the integer-valued function defined by:

$$\mu(\phi)=k \Leftrightarrow \phi \in [(2k-1)\pi, (2k+1)\pi] \quad \text{(Eq. 6)}$$

Eq. 5 provides a stability test in terms of the phase angles $(\phi_0, \phi_1, \ldots, \phi_k)$ at the gain crossover frequencies $(\omega_0, \omega_1, \ldots, \omega_k)$. From the plant G and the choice of PID structure, the quantities on the right-hand side are known. Given this information, it can be ascertained that:

a. Since the left-hand side is always even, the right-hand side must be an even integer as well. When the left hand side evaluates to an odd number, stability can be recovered by switching the feedback sign when $\delta_0$ and $\delta_\infty$ are distinct. Otherwise there is no stabilizing PID;

b. When 2r is the value of the right-hand side after the adjustment, then the stability condition is:

$$\Sigma_k(-1)^k\mu(\phi_k)=r \quad \text{(Eq. 7)}$$

c. When there is a single gain crossover frequency, $\omega_0$, then $\mu(\phi_0)=r$, which indicates that the open-loop phase angle $\phi(\omega_0)$ must lie in the interval $[(2r-1)\pi, (2r+1)\pi]$. When the phase margin requirement is accounted for, this interval further reduces to $[(2r-1)\pi+\theta_m, (2r+1)\pi-\theta_m]$.

d. When there are multiple gain crossover frequencies, $\omega_0, \ldots, \omega_{2m-1}, \omega_{2m}$, there are an infinite number of ways to satisfy the equation:

$$\Sigma_k(-1)^k\mu(\phi_k)=r \quad \text{(Eq. 8), and}$$

e. In practice it can generally be assumed that additional pairs of crossover frequencies $\omega_{2k-1}, \omega_{2k}$ do not contribute to closed-loop stability, that is, $\mu(\phi_{2k-1})=\mu(\phi_{2k})$.

In typical control systems, stability can be enforced by low-frequency actuation rather than high-frequency actuation. With this restriction, a sufficient condition for stability in the multiple-crossover case is that: (1) the open-loop phase angle $\phi(\omega_0)$ at the first crossover $\omega_0$, should lie in the interval $[(2r-1)\pi, (2r+1)\pi]$, and (2) for subsequent pairs of crossovers $\omega_{2k-1}, \omega_{2k}$, the phase angles should satisfy $\mu(\phi_{2k-1})=\mu(\phi_{2k})$. Equivalently, there should be no (net) 180-degree phase crossings where the loop gain is greater than 1.

Exemplary embodiments can include a technique for assessing closed-loop stability and the phase margin requirement $\theta_m$. This technique can be performed by computing the integer r, which may only be performed once; and, computing the gain and unwrapped phase of the plant G over some adequate frequency grid $\omega_G$, which may also be performed once. Then for candidate PID controllers, the technique may:

a. compute the open-loop magnitude and phase $\phi(\omega)$ by superimposing the controller contribution to the plant gain and phase;

b. locate the gain crossover frequencies $\omega_0, \ldots, \omega_{2m-1}, \omega_{2m}$ and compute the corresponding phase values $\omega_0, \ldots, \phi_{2m-1}, \phi_{2m}$ using linear interpolation on the grid $\omega_G$;

c. confirm that $\phi_0$ lies in the interval $$[(2r-1)\pi+\theta_m, (2r+1)\pi-\theta_m];$$

d. confirm that $\mu(\phi_{2k-1})=\mu(\phi_{2k})$ for k=1, ... m; and e. confirm that the phase margin is at least $\theta_m$ the additional crossover frequencies $\omega_1, \omega_2, \ldots, \omega_{2m-1}, \omega_{2m}$.

The above test for candidate PID controllers may involve operations on vectors commensurate with $\omega_G$. In many instances, these vectors can consist of a few hundred points, which allows the test to be performed rapidly in computing environments, such as time-based free-form modeling environments (e.g., a Simulink modeling environment). For example, in one implementation, the test can quickly run in a technical computing environment, such as a MATLAB computing environment or a MATLAB-compatible computing environment, such that interactive controller design activities are supported by exemplary embodiments.

From the Nyquist Stability Test discussed above, the open-loop phase $\phi_0$ at the first crossover $\omega_0$ should lie in the interval $[(2r-1)\pi+\theta_m,(2r+1)\pi-\theta_m]$. Assuming a plant having a phase $\phi_G(\omega_0)$ and a PID that can change the phase by at most 90 degrees, three situations may occur:

(1) The PID can't move the phase into the desired range. This presents a situation where the crossover frequency $\omega_0$ is not admissible;

(2) $\phi_G(\omega_0)-90$ is already in the required interval. In this situation the minimum phase lead needed from the second PID factors is $\Delta\phi=0$; and (3) $\phi_G(\omega_0)-90$ is outside the required interval. In this situation the PID controller must supply some nonzero phase lead $\Delta\phi$.

When given $\Delta\phi$, free parameters $\alpha$ and $\beta$ need to be selected so as to satisfy the Nyquist Stability Test and/or to maximize robustness and design merit. By applying the constraints $0<\alpha<\beta<90$ and $\Delta\phi-90<\beta-\alpha$, a 2D range is delimited that can be coarsely gridded to home in on $(\alpha,\beta)$ combinations that can include a best $(\alpha,\beta)$ combination for a particular application. Exemplary embodiments can use one or more merit functions to rank the robustness and quality of $(\alpha,\beta)$ designs. For example, an embodiment may rank the robustness and quality of each $(\alpha,\beta)$ design according to one or more determined criteria.

Exemplary techniques disclosed herein can employ a composite merit function involving the sensitivity and complementary functions $S=1/(1+GC)$ and $T=GC/(1+GC)$. Because $|1+GC(j\omega)|$ is the distance of the open-loop response to the critical point (−1,0), the size of $|S(j\omega)|$ provides a measure of how close $L(j\omega)$ gets to the critical point and the robustness of the feedback loop. Similarly, how large $|T(j\omega)|$ gets is related to how much overshoot is present in the closed-loop response. When employing techniques disclosed herein, it may be desirable to have the magnitude of S and T remain close to the ideal values:

$$|S(j\omega)| = \left|\frac{j\omega}{j\omega+\omega_0}\right|, |T(j\omega)| = \left|\frac{\omega_0}{j\omega+\omega_0}\right| \quad \text{(Eq. 9)}$$

The values of Eq. 9 can correspond to the situation when open loop is a pure integrator: $L(S)=\omega_0/S$. In particular, the gain $|T(j\omega)|$ should be close to 1 in the frequency range from 0 up to the vicinity of $\omega_0$. A gain greater than 1 can create overshoot and a gain less than 1 introduces slow dynamics and sluggish settling. Still referring to Eq. 9, the gain $|T(j\omega)|$ should roll off past $\omega_0$. When the gain value approaches 1 at some frequency $\omega \gg \omega_0$, the closed-loop response will likely exhibit ringing at this frequency.

Exemplary embodiments can employ merit functions to balance design objectives associated with, for example, PID controllers used to support interactive modeling applications. Appropriate merit functions can facilitate development of designs that satisfy the design objectives. An exemplary merit function that can be used with an embodiment can be written as:

$$F=\max_\omega \max(|S(j\omega)|-2, |T(j\omega)|-T_{max}, T_{min}-|T(j\omega)|) \quad \text{(Eq. 10)}$$

where the lower and upper bounds $T_{min}$ and $T_{max}$ are chosen as:

$$T_{min}(\omega) = \frac{1}{\max(1,\omega/(\omega_0/1.5))}, \quad \text{(Eq. 11)}$$

$$T_{max}(\omega) = \frac{1}{\max(1,\omega/(1.5\omega_0))}$$

Figure 6:
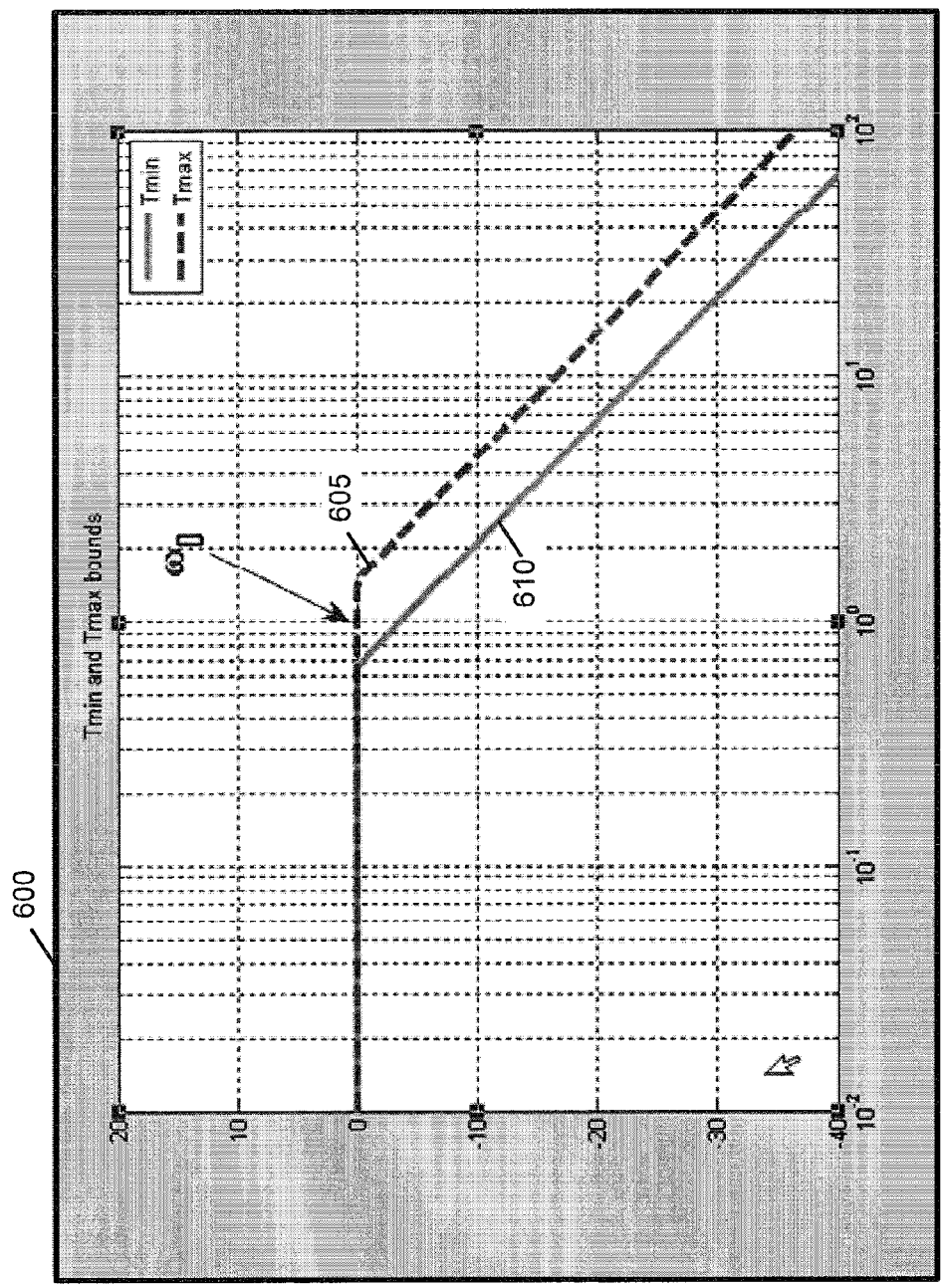
FIG. 6 illustrates an exemplary gain template that can be used with a technique for designing a controller.

FIG. 6 illustrates gain templates for $T_{min}(\omega)$ and $T_{max}(\omega)$ of Eq. 11, above. Referring to FIG. 6, $T_{max}(\omega)$ is represented by trace 605 and $T_{min}(\omega)$ is represented by trace 610.

Referring back to Eq. 10, angles $\alpha$ and $\beta$ are selected so as to minimize the merit function F subject to passing the Nyquist Stability Test. Satisfactory tuning can generally be achieved when values of F are smaller than 0.1. Exemplary embodiments can make use of techniques that search for an optimal $(\alpha,\beta)$ combination. Examples of search techniques include, but are not limited to, brute-force gridding, direct search, or gradient-descent techniques.

An exemplary embodiment can produce satisfactory results using a coarse gridding technique that grids the $(\alpha,\beta)$ range $[0,45]\times[45,90]$ by increments of 5 degrees (total of 100 points), discards points $(\alpha,\beta)$ that violate the constraints $\Delta\phi-90<\beta-\alpha$ or that fail the Nyquist Stability Test. The gridding technique can then evaluate the merit function F at the remaining points, selecting the point that yields the smallest value of F, where this smallest value is referred to as $F_{min}$.

The $F_{min}$ value for a given crossover frequency $\omega_0$ is indicative of the viability of PIDs with the corresponding bandwidth. When $F_{min}$ is much larger than 0.1, the PID may exhibit poor performance/robustness. In this situation, the crossover frequency $\omega_0$ may need to be adjusted. In some situations, a crude search in the vicinity of the target frequency (based on the plant natural frequency $\omega_T$) is generally enough to fix the performance/robustness problem. For example, $F_{min}$ can be computed for 10 candidate crossover frequencies spanning the interval $[0.01\omega_T, 100\omega_T]$. Then, a crossover frequency closest to $\omega_T$ with an acceptable $F_{min}$ value may be selected.

Exemplary User Interfaces

User interfaces described below can use algorithms discussed above to provide fast, interactive workflows to users.

These fast, interactive workflows are supported due to the speed of the control algorithm and by allowing users to specify characteristics of PID controllers using terms familiar to a typical user.

Figure 7:
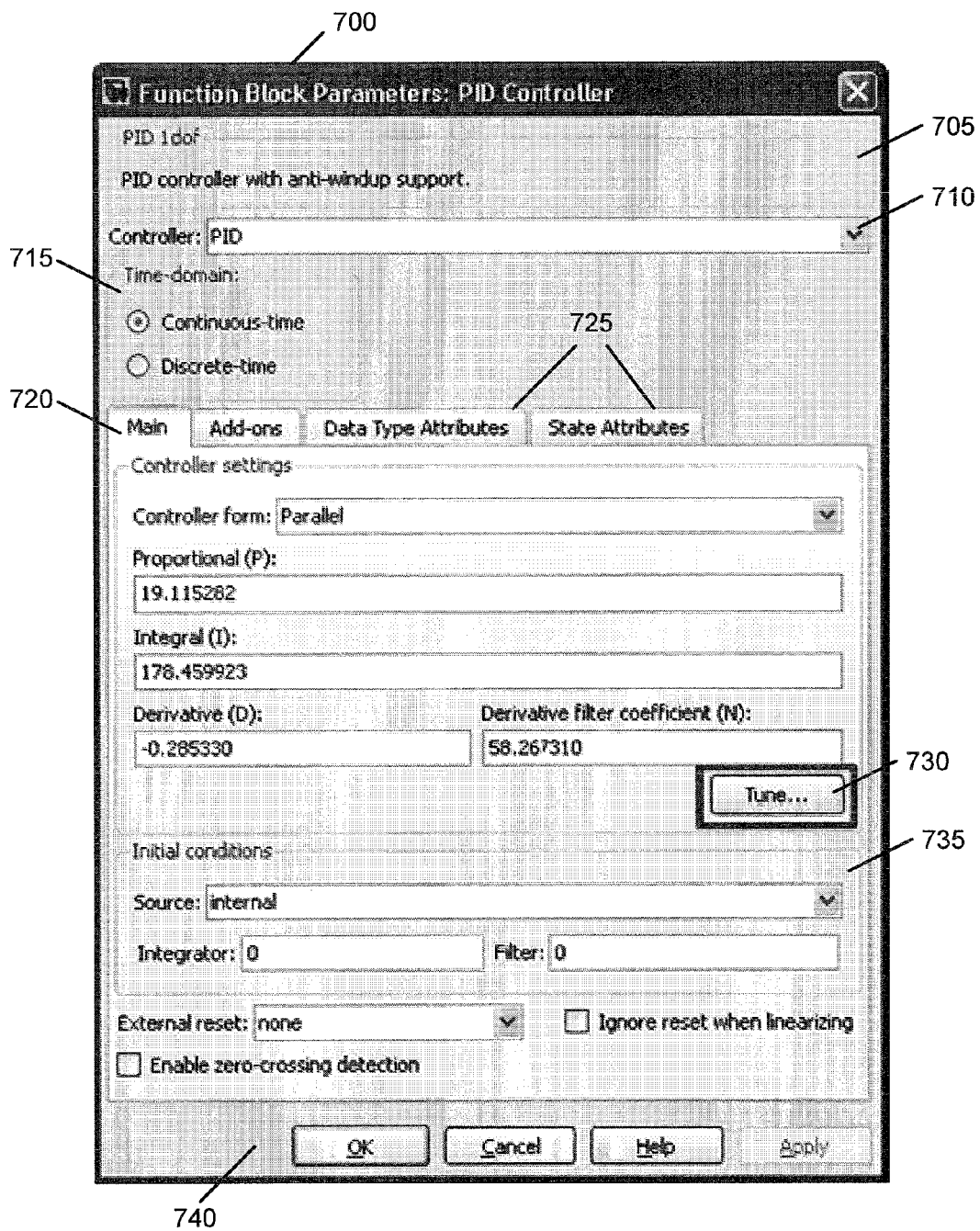
FIG. 7 illustrates an exemplary user interface for selecting a PID controller.

FIG. 7 illustrates an exemplary user interface for specifying a HD controller. In an embodiment, modeling environment 120 may provide user interface 700 to a user via controller logic 250. For example, the user may be working in model representation 160 and may wish to create a PID controller for use with a model of a system, such as plant 170. The user may select an icon using a pointing device and interface 700 may be provided to the user via display device 150.

Interface 700 may include an identifier 705 that provides information about the PID controller that the user is creating. In an embodiment, a user may select, e.g., by double clicking, cruise control system 330 and interface 700 may appear on display device 150. Other embodiments can include a plurality of interfaces 700 where each instance of interface 700 is associated with a controller in a model that includes a plurality of controllers.

Referring to FIG. 7, selection field 710 may allow the user to select a controller type, such as a PID controller, a PI controller, etc. Domain field 715 may allow a user to select whether the controller is a continuous time controller or a discrete time controller. Interface 700 may include one or more pages 720 for displaying and/or receiving information about settings for a controller. For example, an active page may be displayed in the foreground and may provide information to the user about coefficients for P, I, and D, a form for the controller (e.g., parallel), and filter coefficients for a specified derivative filter. Interface 700 may include other pages that are not active and these pages may be identified using tabs 725. A user may select a tab 725 to make a page related to the tab active.

Interface 700 may also include a tuning button 730 that causes a controller to be tuned using information in interface 700 and/or information available in a model to which the controller is connected. In an embodiment, tuning button 730 may be selected, and gains for P, I, and D may be automatically generated using computer 105. For example, in an embodiment the gains may be generated using a default design performance specification. The embodiment may further open interface 700 based on an initial design using the default design performance specification. Tuning button 730 may further cause a controller design algorithm to automatically linearize a model connected to an input and an output of controller block 330. In an embodiment, an entire model can be linearized when tune button 730 is selected. In FIG. 3, selecting tune button 730 may result in a linear model of automobile 350 multiplied by −1 due to summation block (+ and −) in FIG. 3.

Initial conditions field 735 may provide information about a source (e.g., internal or external), an integrator, and/or a filter. Interface 700 may also include buttons 740 to store information in interface 700, close interface 700, cancel user selections from interface 700, provide help to a user regarding interface 700 and/or apply information displayed via interface 700 to a model.

Figure 8:
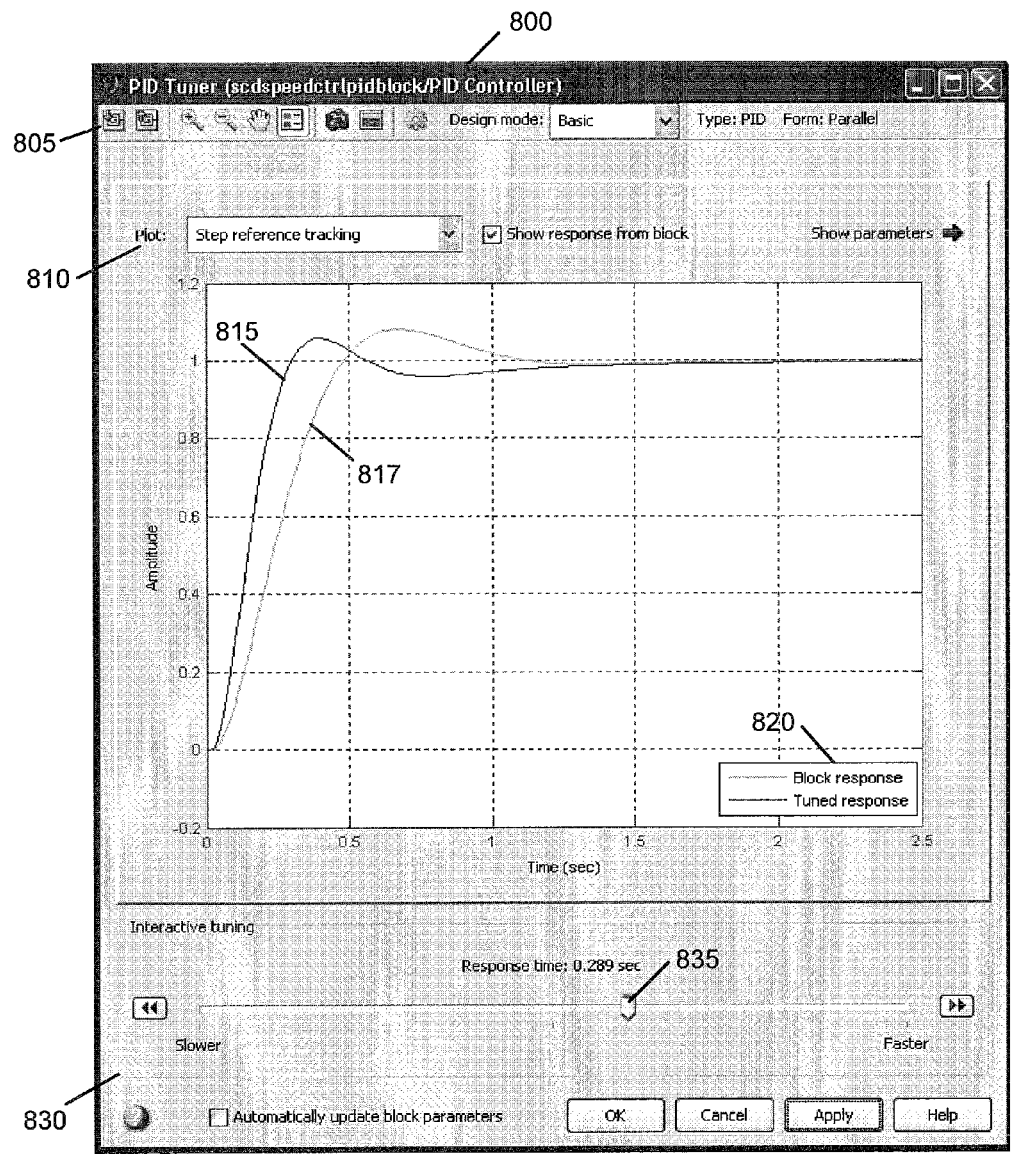
FIG. 8 illustrates an exemplary user interface for tuning the response of a PID controller.

FIG. 8 illustrates an exemplary user interface for tuning the response of a PID controller. Interface 800 may be used to display information about a response of a controller and to receive user inputs related to the controller. In an embodiment, interface 800 may include toolbar 805 that can include icons representing actions that a user can select. For example, a zoom icon may allow the user to zoom into a portion of a plot related to the controller.

Plot region 810 may include information about transfer functions 815 and 817 for the closed loop system. For example, plot region 810 may display a plot of amplitude versus time for a block response (trace 817) or tuned response (trace 815). Legend 820 may provide a user with descriptions about traces 815 and 817. Design region 830 may include user manipulated mechanisms that can change characteristics of a controller. For example, design region 830 may include a slider 835 that can be manipulated to increase or decrease a response speed for a controller. In an embodiment, controller logic 250 may establish an initial position for the slider (e.g., midway between a minimum value and maximum value) and a user may move the slider from the initial position if desired. In an embodiment, transfer function 815 may change in real-time when a user moves slider 835.

Interfaces used with exemplary embodiments may be configured to allow users to modify one or more parameters for a controller. For example, interface 800 includes a single slider 835 that allows the user to modify a response speed for a controller. Other embodiments may allow a user to modify other parameters alone or in combination with a response speed or other type of parameter.

Figure 9A:
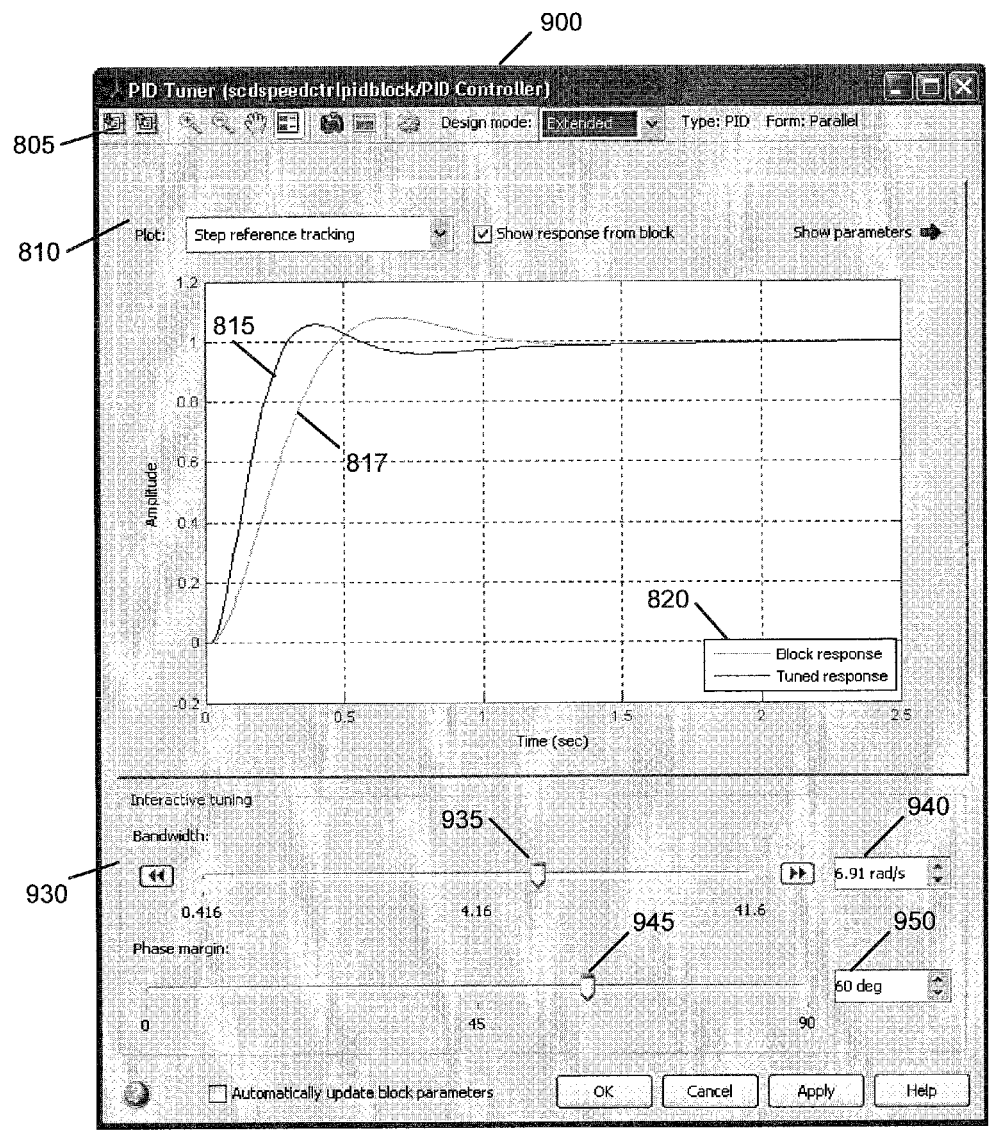
FIGS. 9A and 9B illustrate exemplary user interfaces for tuning the response of PID controllers.

FIG. 9A illustrates an exemplary user interface for tuning the response of a PID controller. The user interface of FIG. 9A may be a more advanced interface for designing controllers as compared to the interface of FIG. 8. Interface 900 may be used to tune a controller using two parameters, such as a closed-loop bandwidth and a phase margin. Interface 900 may include features discussed in connection with interface 700 or 800 and may further include design region 930.

Design region 930 may include two or more user manipulated input mechanisms to modify parameters for a controller. For example, a first slider 935 may be used to modify a closed loop bandwidth for a PID controller, and a second slider 945 may be used to modify a phase margin for the PID controller. Design region 930 may further include a first readout 940 for displaying numerical information related to the closed loop bandwidth and a second readout 950 for displaying information about the phase margin.

Figure 9B:
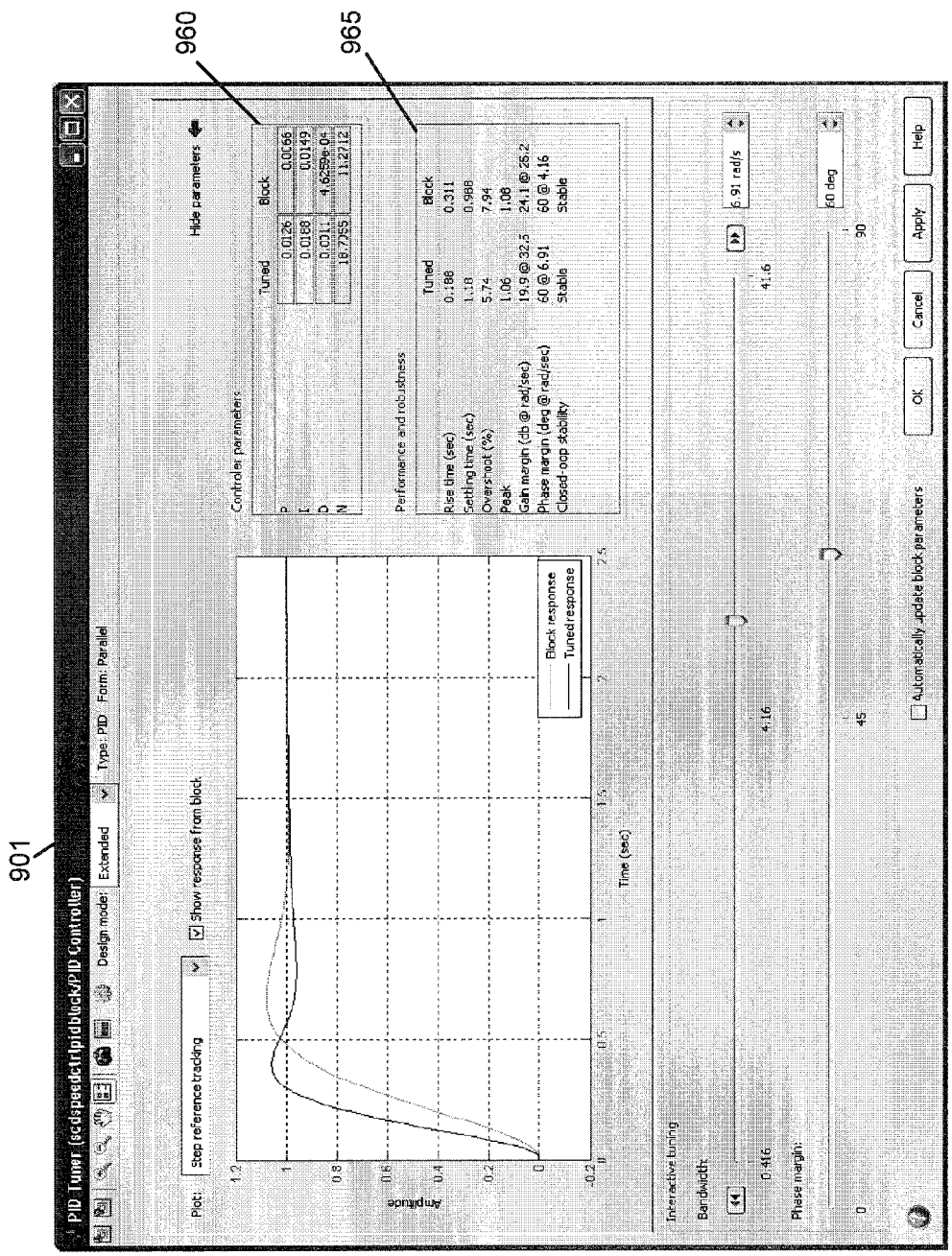

FIG. 9B illustrates an alternative implementation of interface 900, which is denoted as interface 901. Interface 901 can be configured to display designed PID parameters, such as P, I, D, and N values as well as one or more performance and robustness measurements, such as settling time, overshoot, etc. For example, controller parameters can be displayed in region 960 and performance and robustness metrics can be displayed in region 965.

Other embodiments of user interfaces used with PID controllers and control techniques described herein can be configured in ways that are different from the configurations illustrated in FIGS. 7, 8, 9A and 9B. These other configurations can include more features or fewer features than the illustrated embodiments without departing from the spirit of the invention.

Exemplary Processing

Exemplary processing acts can make use of control algorithms discussed herein to provide users with a fast, interactive environment for designing controllers.

Figure 10A:
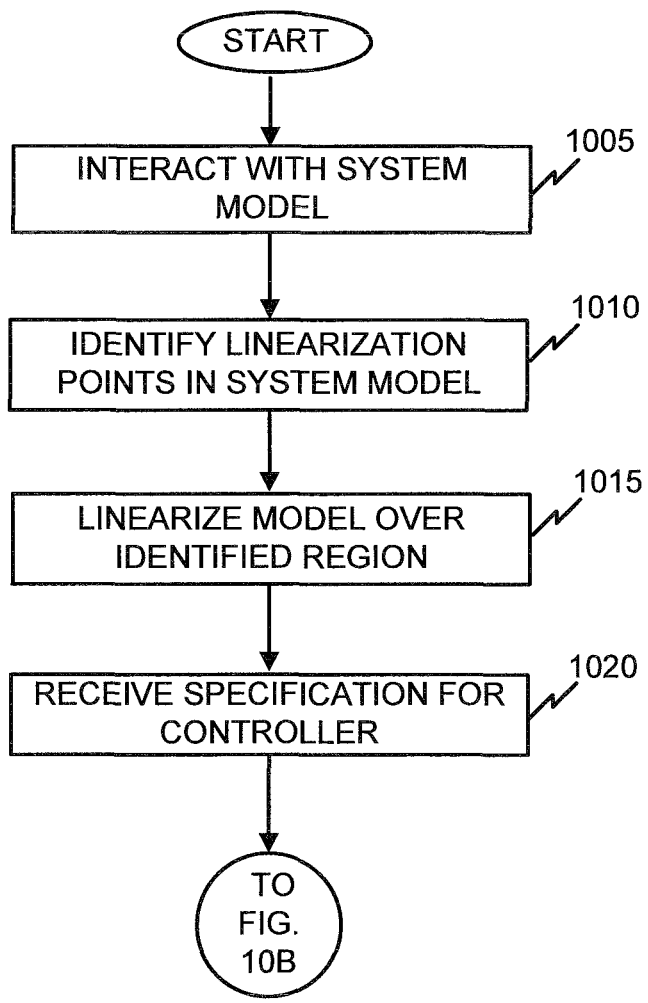
FIGS. 10A and 10B illustrate exemplary processing that can be used to implement an embodiment of the invention.
Figure 10B:
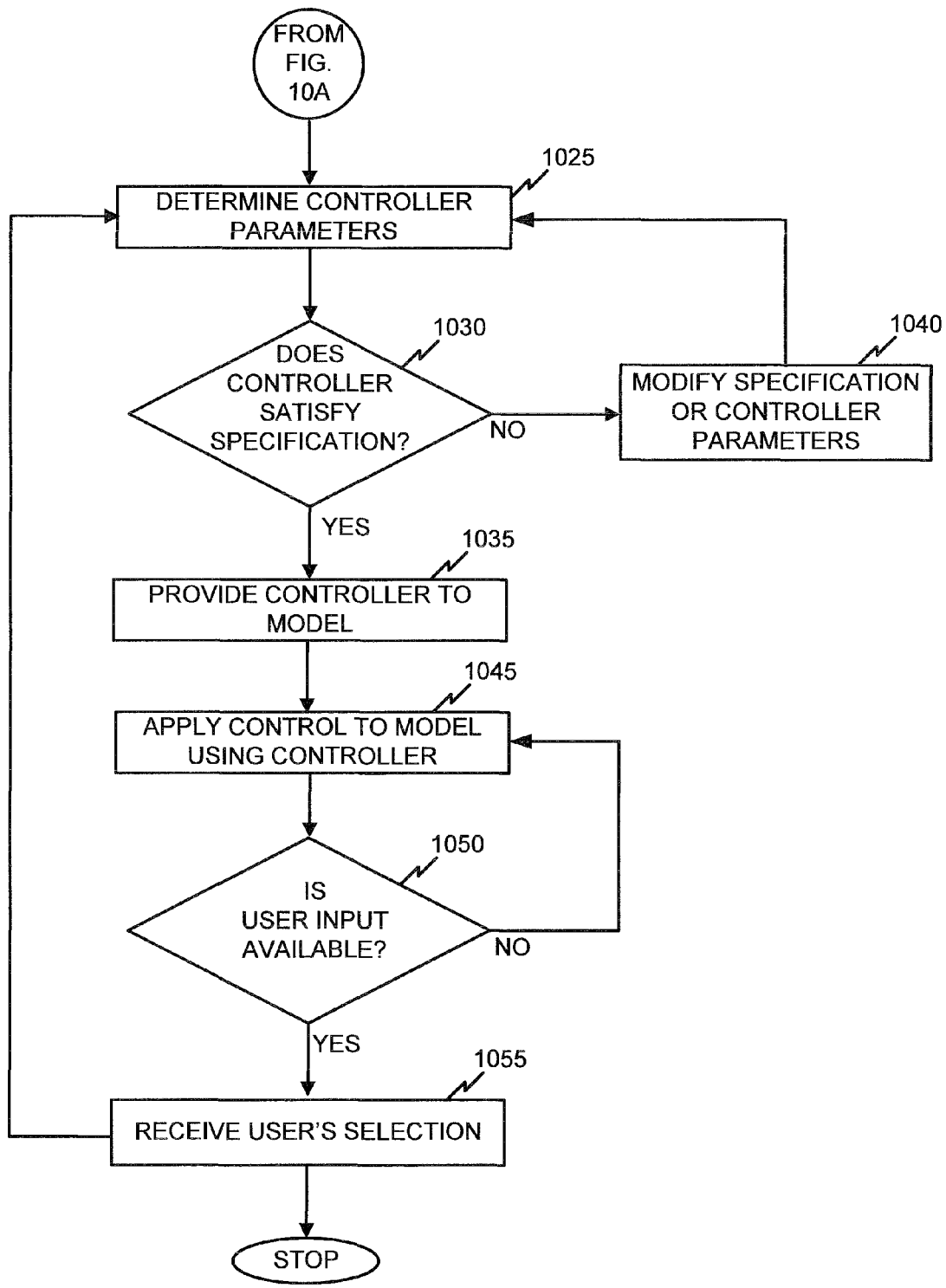

FIGS. 10A and 10B illustrate exemplary processing that can be used for practicing embodiments of the invention. Embodiments described herein can be used to allow users to develop and implement controllers in a way that is consistent with typical workflows experienced by the user. For example, a user may interact with a free-form modeling environment in a typical manner. The user may also think of operating characteristics for controller in a typical manner, such as speed of response, phase margin, closed-loop response, closed-loop bandwidth, etc. Embodiments allow the user to maintain the typical workflows while also allowing the user to interactively design and implement controllers, such as PID controllers, in the model using operating characteristics familiar to the user.

Referring to FIG. 10A, an embodiment of the invention may interact with a system model that will be controlled using a controller (act 1005). For example, a user may develop a model of a system that needs to be controlled to allow the system to operate in a desired manner. The user may plan to deploy one or more controllers in the model to achieve the desired operation.

The user may identify points (locations) in the model, where the points determine a region of the model that will be linearized to form a LTI model (act 1010). The identified region of the model is linearized to form a LTI model (act 1015). Once a region of the model is linearized, a specification for a controller that will be used with the LTI model may be received (act 1020).

For example, a user may select a controller block for the model and may deposit the block in the model. A dialog window may open for the controller block and may allow the user to enter specifications for a controller that will be used to control the LTI portion of the model. For example, a user may specify desired response speed for the controller, a phase margin for the controller, a closed-loop response for the controller, and/or a closed-loop bandwidth for the controller.

Referring now to FIG. 10B, the specifications received from the user may be used to determine parameters for a controller (act 1025). In an embodiment, the control technique described in connection with FIGS. 5 and 6 may be used to determine the controller parameters. Embodiments may automatically determine controller parameters based on the user input. In some embodiments, a determination may be made as to whether the controller satisfies the specification(s) entered by the user (act 1030). For example, a user may have specified a particular response speed for a controller, and in act 1030 computer 105 may determine whether the controller can satisfy the response speed requirement.

When the controller does satisfy the specification(s), a controller satisfying the specification(s) may be provided to the model (act 1035). In contrast, when computer 105 determines that the controller does not satisfy a specification, computer 105 may modify aspects of the specification(s) or parameters for the controller (act 1040). When computer 105 modifies specification(s) or parameters, computer 105 may attempt to design a controller that comes as close as reasonably possible to achieving the specification(s). In an embodiment, the user may be notified that a requested specification could not be met; and, therefore, had to be modified to design an adequate controller.

After act 1035, a controller satisfying the specification(s) may be applied to the LTI portion of the model (act 1045). The controller may control the LTI portion of the model when the model executes. Exemplary embodiments may allow a user to adjust parameters for the controller when the controller is in the model. For example, user interfaces, such as the ones illustrated in FIGS. 8 and 9A and B, can be used to adjust parameters of the controller using characteristics that are intuitive to a typical user. For example, the user can increase a response speed for the controller by moving a slider using a pointing device. Movement of the slider may cause parameters for a PID controller to be automatically tuned to produce an updated controller.

An exemplary embodiment may poll for user inputs and may determine whether a user input is available (act 1050). When a user input is detected, the user's selection may be received (act 1055) and may be used in act 1025 to recomputed parameters for the controller. When user inputs are not available, an existing controller may continue to be applied to the model as is done in act 1045.

Exemplary Architecture

Figure 11:
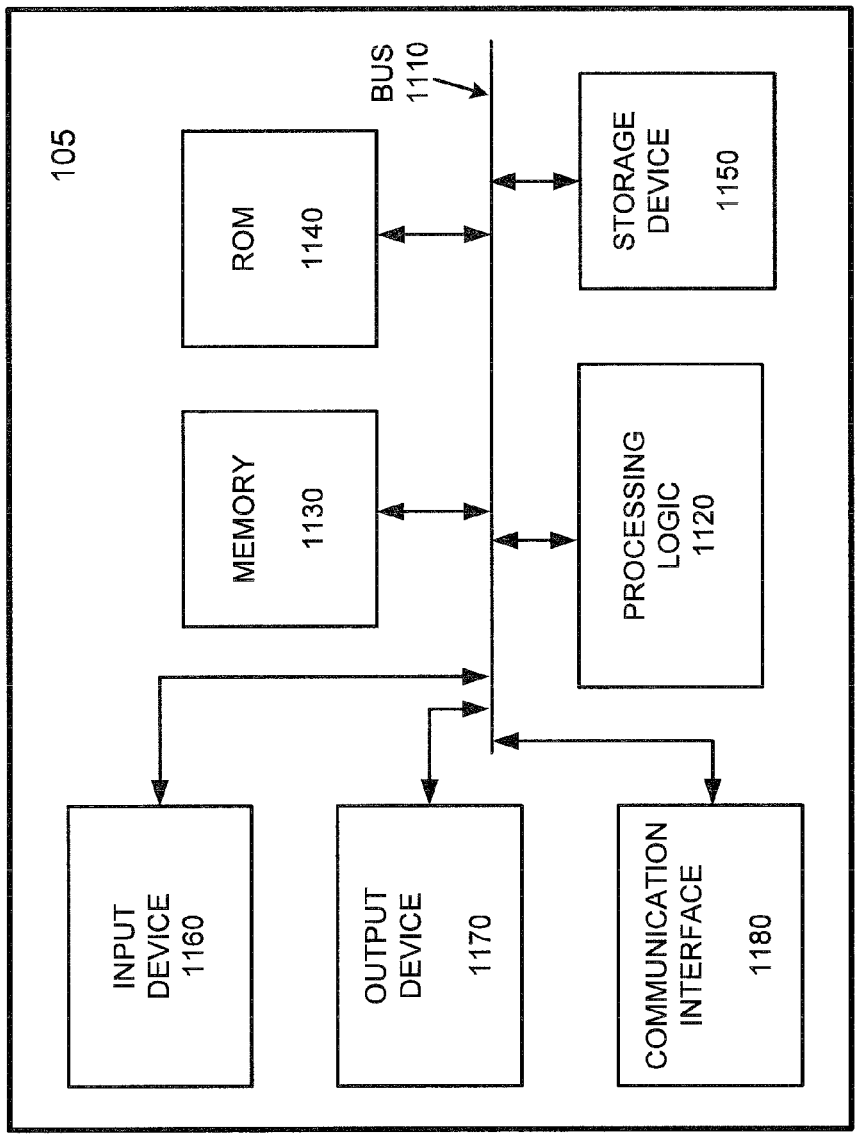
FIG. 11 illustrates an exemplary architecture for implementing an embodiment of the invention.

FIG. 11 illustrates an exemplary computer architecture that can be used to implement computer 105 of FIG. 1. FIG. 11 is an exemplary diagram of an entity corresponding to computer 105. As illustrated, the entity may include a bus 1110, processing logic 1120, a main memory 1130, a read-only memory (ROM) 1140, a storage device 1150, an input device 1160, an output device 1170, and/or a communication interface 1180. Bus 1110 may include a path that permits communication among the components of the entity.

Processing logic 1120 may include a processor, microprocessor, or other types of processing logic (e.g., field programmable gate array (FPGA), graphics processing unit (GPU), digital signal processor (DSP), application specific integrated circuit (ASIC), etc.) that may interpret and execute instructions. For an implementation, processing logic 1120 may include a single core processor or a multi-core processor. In another implementation, processing logic 1120 may include a single processing device or a group of processing devices, such as a processing cluster or computing grid. In still another implementation, processing logic 1120 may include multiple processors that may be local or remote with respect each other, and may use one or more threads while processing.

Main memory 1130 may include a random access memory (RAM) or another type of dynamic storage device that may store information and instructions for execution by processing logic 1120. ROM 1140 may include a ROM device or another type of static storage device that may store static information and/or instructions for use by processing logic 1120. Storage device 1150 may include a magnetic, solid state and/or optical recording medium and its corresponding drive, or another type of static storage device that may store static information and/or instructions for use by processing logic 1120.

Input device 1160 may include logic that permits an operator to input information to the entity, such as a keyboard, a mouse, a pen, a touchpad, an accelerometer, a microphone, voice recognition, camera, biometric mechanisms, etc. In an embodiment, input device 1160 may correspond to input device 140.

Output device 1170 may include a mechanism that outputs information to the operator, including a display, a printer, a speaker, a haptic interface, etc. Communication interface 1180 may include any transceiver-like logic that enables the entity to communicate with other devices and/or systems. For example, communication interface 1180 may include mechanisms for communicating with another device or system via a network.

The entity depicted in FIG. 11 may perform certain operations in response to processing logic 1120 executing software instructions stored in a computer-readable storage medium, such as main memory 1130. A computer-readable storage medium may be defined as a physical (e.g., tangible) or logical memory device. The software instructions may be read into main memory 1130 from another computer-readable storage medium, such as storage device 1150, or from another device via communication interface 1180. The software instructions contained in main memory 1130 may cause processing logic 1120 to perform techniques described herein when the software instructions are executed on processing logic. Alternatively, hardwired circuitry may be used in place of or in combination with software instructions to implement techniques described herein. Thus, implementations described herein are not limited to any specific combination of hardware circuitry and software.

Although FIG. 11 shows exemplary components of the entity, in other implementations, the entity may contain fewer, different, or additional components than depicted in FIG. 11. In still other implementations, one or more components of the entity may perform one or more tasks described as being performed by one or more other components of the entity.

Exemplary Distributed Embodiment

Distributed embodiments may perform processing using two or more processing resources. For example, embodiments can perform processing using two or more cores in a single processing device, distribute processing across multiple processing devices installed within a single enclosure, and/or distribute processing across multiple types of processing logic connected by a network.

Figure 12:
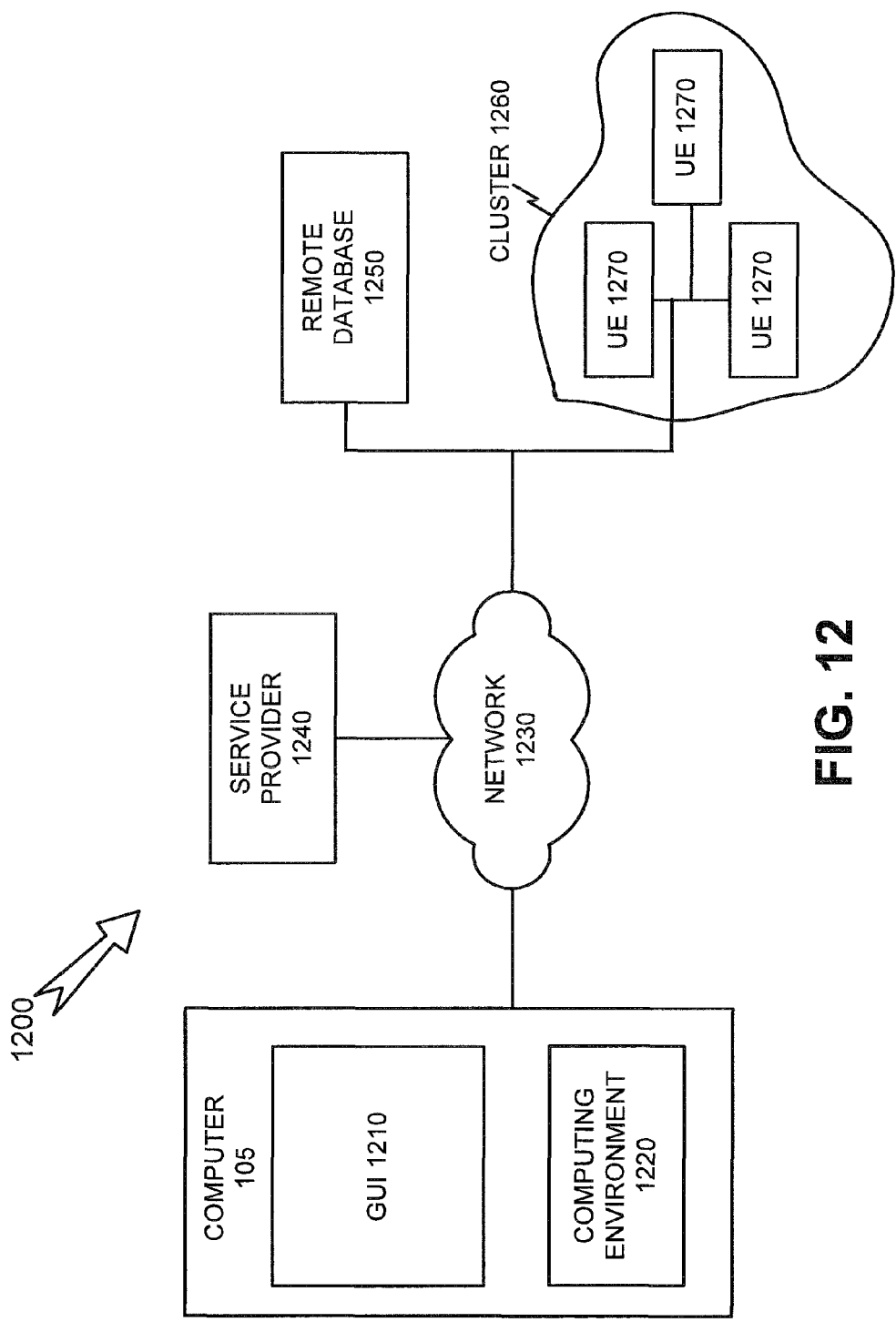
FIG. 12 illustrates an exemplary distributed embodiment for interactively designing and implementing controllers in free-form models.

FIG. 12 illustrates an exemplary system that can support interactively designing controllers for non-linear models on behalf of a client device (e.g., computer 105) using a distributed computing environment. System 1200 may include computer 105, network 1230, service provider 1240, remote database 1250 and cluster 1260. The implementation of FIG. 12 is exemplary and other distributed implementations of the invention may include more devices and/or entities, fewer devices and/or entities, and/or devices/entities in configurations that differ from the exemplary configuration of FIG. 12.

Computer 105 may include graphical user interface (GUI) 1210 and modeling environment 120. GUI 1210 may include an interface that allows a user to interact with computer 105 and/or remote devices (e.g., service provider 1240). In an exemplary embodiment, GUI 1210 may be similar to the interfaces of FIGS. 7, 8, 9A and 9B.

Network 1230 may include any network capable of transferring data (e.g., packet data or non-packet data). Implementations of network 1230 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.10, etc.

Network 1230 may include network devices, such as routers, switches, firewalls, and/or servers (not shown). Network 1230 may be a hardwired network using wired conductors and/or optical fibers and/or may be a wireless network using free-space optical, radio frequency (RF), and/or acoustic transmission paths. In an implementation, network 1230 may be a substantially open public network, such as the Internet. In another implementation, network 1230 may be a more restricted network, such as a corporate virtual network. Implementations of networks and/or devices operating on networks described herein are not limited to any particular data type, protocol, architecture/configuration, etc. For example, in an embodiment, network 1230 may be a quantum network that uses quantum-compatible networking protocols.

Service provider 1240 may include a device that makes a service available to another device. For example, service provider 1240 may include an entity that provides one or more services to a destination using a server and/or other devices. Services may include instructions that are executed by a destination to perform an operation. Alternatively, a service may include instructions that are executed on behalf of a destination to perform an operation on the destination's behalf.

Assume, for sake of example, that a service provider operates a web server that provides one or more web-based services to a destination, such as computer 105. The web-based services may allow computer 105 to perform distributed simulations of electrical and/or mechanical systems using hardware that is operated by the service provider. For example, a user of computer 105 may be allowed to interactively design PID controllers for system models using the service provider's hardware. In an implementation, a customer (user) may receive services on a subscription basis. A subscription may include an arrangement, such as a monthly subscription, a per-use fee, a fee based on an amount of information exchanged between service provider 1240 and the customer, a fee based on a number of processor cycles used by the customer, a fee based on a number of processors used by the customer, etc.

Remote database 1250 may include a device that stores machine-readable information for use by other devices, such as computer 105. In an embodiment, remote database 1250 may include an array or grid of storage devices (e.g., hard disks, optical disks, solid-state storage devices, etc.) that store data structures containing information about system models, controllers, etc.

Cluster 1260 may include a group of processing devices, such as units of execution 1270 that can be used to perform remote processing (e.g., distributed processing, parallel processing, etc.). Units of execution 1270 may include hardware and/or hardware/software based devices that perform processing operations on behalf of a requesting device, such as computer 105. In an embodiment, units of execution 1270 may each compute a partial result and the partial results can be combined into an overall result for a model.

Embodiments operating in a standalone or in a distributed implementation can perform activities described herein on code associated with text-based computing and/or modeling applications, such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Embodiments can further perform activities described herein on code associated with graphical modeling environments, such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from International Business Machines (IBM) Corporation; Ptolemy from the University of California at Berkeley; ASCET, CoWare, or aspects of a Unified Modeling Language (UML) or SysML environment. Graphical modeling environments can include block diagrams and/or other types of diagrams.

Embodiments may be implemented in a variety computing environments, such as a technical computing environment that support statically or dynamically typed programming languages. For example, a dynamically typed language may be one used to express problems and/or solutions in mathematical notations familiar to those of skill in the relevant arts. For example, the dynamically typed language may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations. An exemplary embodiment that uses a dynamically typed language may be implemented in the Embedded MATLAB programming language that can be used to create code for use in embedded applications.

Exemplary Embodiments

In an embodiment, one or more computer-readable media can hold one or more executable instructions that when executed on processing logic determine parameters for a proportional integral derivative (PID) controller for an arbitrary nonlinear model. In the embodiment, the media can hold one or more instructions for automatically determining the portion of the arbitrary nonlinear model to be linearized, where the arbitrary nonlinear model is in a free-form modeling environment. The instructions can linearize the determined portion of the arbitrary nonlinear model, and the linearizing may produce a linear model. The instructions can compute an open-loop frequency response of the linear model and can receive a design specification on behalf of a user, where the design specification identifies a desired gain crossover frequency for the open-loop response, or a desired phase margin at the gain crossover frequency. The instructions may automatically tune PID controller gains using the frequency response and the received input, where the automatic tuning is configured to achieve a desired performance when the PID controller controls the linear model, and to be performed within a time interval that supports interactive PID controller design for the arbitrary nonlinear model. When desired, the embodiment can be configured to allow the desired gain crossover frequency and the desired phase margin to be specified using a displaceable slider associated with a graphical user interface (GUI), or to allow the desired gain crossover frequency to be specified using the displaceable slider and the desired phase margin to be selected automatically. The embodiment can also be configured to allow the tuning to be performed on behalf of a block that interacts with a Simulink-compatible language, or a Simulink model.

In another embodiment, one or more computer-readable media holding one or more executable instructions that when executed on processing logic interface a block representing a controller with an algorithm that generates the controller used in the block when the block executes in a model can be provided. In the embodiment, the media can hold one or more instructions for receiving a linear time invariant (LTI) model. In the embodiment, the LTI model can approximate an arbitrary nonlinear model at an operating condition representing a portion of the arbitrary nonlinear model. The LTI model may further be capable of having delays, and may be capable of having substantially any order. The instructions may further be configured to receive performance and robustness characteristics, where the performance and robustness characteristics are for a controller that controls the LTI model, and where the performance and robustness characteristics iden-tify an open-loop gain-crossover frequency, and an open-loop phase margin. In the embodiment, the instructions can further provide the performance and robustness characteristics to a tuning algorithm that generates a controller satisfying the characteristics, where the tuning algorithm automatically tunes controller parameters satisfying the performance and robustness characteristics. When desired, the block can include a tuning mechanism that causes the controller parameters to be written to the block. In the embodiment, the blocks can allow the user to interactively perform tradeoffs between controller robustness, and controller performance. The embodiment can support providing the controller to the model in real-time, where real-time includes a processing delay that does not adversely impair interactive operation of the block or the controller algorithm by a user. In the embodiment, the controller can be a proportional (P) controller, an integral (I) controller, a proportional derivative (PD) controller (with a derivative filter, or without a derivative filter), a proportional integral (PI) controller, or a PID controller (with a derivative filter, or without a derivative filter).

In still another embodiment, one or more computer-readable media holding one or more executable instructions that when executed on processing logic tune a controller used with a linearized plant model can be provided. In the embodiment, the media can hold one or more instructions for initiating an interactive tuning interface, where the interactive tuning interface is configured for computing loop responses, graphically displaying the loop responses, computing performance and robustness information, graphically displaying the performance and robustness information, tuning parameters for the controller, and for receiving user inputs. The instructions can also linearize the plant model to produce the linearized plant model, where the linearized plant model is controlled by the controller when the plant is executing. The instructions can receive a user input, where the user input specifies a gain crossover frequency, and an open-loop phase margin. The instructions can also tune parameters for the controller, where the tuning is configured for automatically solving certain parameters for the controller based on the specified gain crossover frequency and the open-loop phase margin, automatically optimizing remaining controller parameters within a reduced search space, and producing a tuned controller having characteristics that correspond to the specified inputs. The instructions can further display a response for the tuned controller, where the response indicates how the tuned controller operates with the plant when the plant is executing. In the embodiment, the interactive tuning interface can be used with a proportional integral derivative (PID) controller block in a Simulink model. When desired, the characteristics of the tuned controller can satisfy a merit function. The embodiment can also support performing an optimization with respect to a parameter other than the fixed parameters. In the embodiment, the interactive tuning interface can be configured to include instructions for displaying a rise time, a settling time, an overshoot, a peak, a gain margin, a phase margin, a maximum sensitivity, a maximum complementary sensitivity, or a closed-loop stability. In the embodiment, the plant can be represented as a single input single output (SISO) loop. The embodiment can include instructions for selecting an operating point for the arbitrary nonlinear model, where the operating point indicates where the plant is linearized, and designed, and where the tuned controller controls the arbitrary nonlinear model proximate to the operating point. The embodiment can further be configured to select a second operating point for the arbitrary nonlinear model, produce a tuned controller for controlling the arbitrary nonlinear model proximate to the second operating point, and perform gain scheduling to schedule the tuned controller for the first operating point and the tuned controller for the second operating point.

In yet another embodiment, one or more computer-readable media holding one or more executable instructions that when executed on processing logic determine parameters for a controller having one, two, three or four parameters, where the controller is configured for controlling a nonlinear model. The media can hold instructions for linearizing at least a portion of the nonlinear model in a free-form modeling environment, where the linearizing produces a linear model that is valid over a certain region. The media can also hold instructions for computing an open-loop frequency response of the linear model and for receiving an input for a desired gain crossover frequency for the open-loop response, or a desired phase margin at the gain crossover frequency. The media can also hold instructions for automatically tuning gains using the frequency response, and the received input, where the automatic tuning achieves the desired performance goals, and the automatic tuning is performed during a time interval that supports interactive PID controller design for the arbitrary nonlinear model.

In yet another embodiment, a computer-implemented method for controlling a plant of any order is provided. The method can be configured for interacting with a nonlinear system model using an interactive controller block that is displayable in the system model and for linearizing the system model using the interactive controller block. The method can produce a plant for use in the system model, where the plant is produced based on the linearizing, the plant is of any determined order, and the plant is controlled by the interactive controller block when the system model executes. The method can receive a user input specifying characteristics for the interactive controller block when the interactive controller block executes, where the input includes a gain crossover frequency, and a phase margin. In the embodiment, the input can be received via a graphical user interface (GUI) associated with the interactive controller block. The method can tune a controller associated with the interactive controller block, where the tuning is performed automatically and can include solving for parameters of the controller when there are two or fewer parameters, and solving for two parameters and optimizing for remaining parameters when there are more than two parameters of the controller.

In still another embodiment, an apparatus for controlling a plant of any order is provided. The plant can include a means for interacting with a nonlinear system model and a means for linearizing the system model. The system can also include a means for producing a plant for use in the system model, where the plant produced based on the linearizing, the plant is of any determined order, and the plant is controlled by an interactive controller means when the system model executes. The apparatus can include a means for receiving a user input specifying characteristics for the interactive controller means, where the input specifies a gain crossover frequency, and a phase margin. The apparatus can include a means for tuning a controller associated with the interactive controller means, the tuning performed automatically, where the tuning includes solving for parameters of the controller when there are two or fewer parameters, and solving for two parameters and optimizing for remaining parameters when there are more than two parameters of the controller.

CONCLUSION

Implementations may allow users to interactively design controllers for system models using characteristics familiar to the user.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 10A and 10B, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 1, 11 or 12 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, or a combination of hardware and software. No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining features of the invention.

What is claim is:

1. One or more non-transitory computer-readable media holding one or more executable instructions that, when executed on processing logic, tune parameters for a proportional integral derivative (PID) controller for an arbitrary nonlinear model, the media holding one or more instructions for:

automatically determining a portion of the arbitrary nonlinear model to be linearized, the determination based on a desired operating point of the arbitrary nonlinear model;

linearizing the determined portion of the arbitrary nonlinear model, the linearizing producing a linear model;

computing an open-loop frequency response of the linear model;

receiving a design specification on behalf of a user, the design specification defining:

a desired gain crossover frequency for the open-loop frequency response, or a desired phase margin at the desired gain crossover frequency for the open-loop frequency response; and automatically tuning the PID controller parameters using the open-loop frequency response and the received design specification, the automatic tuning:

solving algebraically at least two of a P, I, and D parameter of the PID controller for achieving a desired performance when the PID controller controls the linear model in a closed-loop.

2. The media of claim 1, where the desired performance is: specified by the user, or specified programmatically.

3. The media of claim 1, where the design specification is received via a graphical user interface (GUI), where the GUI is associated with a component that represents the PID controller in the arbitrary nonlinear model.

4. The media of claim 1, where:
the desired gain crossover frequency and the desired phase margin are specified using a displaceable slider associated with a graphical user interface (GUI); or
the desired gain crossover frequency is specified using the displaceable slider and the desired phase margin is selected automatically.

5. The media of claim 1, where the tuning is performed on behalf of a component that interacts with:
a Simulink-compatible language,
a Simulink model,
a MATLAB-compatible language, or
a MATLAB model.

6. One or more non-transitory computer-readable media holding one or more executable instructions that, when executed on processing logic, interface a block representing a controller with a tuning algorithm that generates the controller used in the block, the media holding one or more instructions for:
receiving:
a linear time invariant (LTI) model, the LTI model:
approximating an arbitrary nonlinear model at an operating condition representing a portion of the arbitrary nonlinear model, the nonlinear model:
capable of having delays, and
capable of having substantially any order,
performance and robustness characteristics for the controller that controls the nonlinear model at the operating condition, the performance and robustness characteristics specifying:
an open-loop gain-crossover frequency, and
an open-loop phase margin; and
providing:
the performance and robustness characteristics to the tuning algorithm that generates the controller satisfying the characteristics, the tuning algorithm automatically tuning controller parameters to satisfy the performance and robustness characteristics.

7. The media of claim 6, where the arbitrary non linear model is in a free-form modeling environment.

8. The media of claim 6, where the block includes a tuning mechanism that causes the controller parameters to be written to the block.

9. The media of claim 6, where the block allows a user to interactively perform tradeoffs between:
controller robustness, and
controller performance.

10. The media of claim 6, where the controller is provided to the LTI model in real-time, where real-time includes a processing delay that does not adversely impair interactive operation of the block or the tuning algorithm by a user.

11. The media of claim 6, where the controller is at least one of:
a proportional (P) controller,
an integral (I) controller,
a proportional derivative (PD) controller, the PD controller:
with a derivative filter, or
without the derivative filter,
a proportional integral (PI) controller, or
a PID controller, the PID controller:
with the derivative filter, or
without the derivative filter.

12. One or more non-transitory computer-readable media holding one or more executable instructions that, when executed on processing logic, tune a controller used with a linearized plant model of an arbitrary nonlinear model, the media holding one or more instructions for:
initiating an interactive tuning interface, the interactive tuning interface for:
computing loop responses,
graphically displaying the loop responses,
computing performance and robustness information,
graphically displaying the performance and robustness information,
tuning parameters for the controller, and
receiving user inputs;
linearizing at least a portion of the arbitrary nonlinear model to produce the linearized plant model, the linearized plant model controlled by the controller when the linearized plant model is executing;
receiving a user input, the user input determining:
a gain crossover frequency, and
an open-loop phase margin;
tuning parameters for the controller, the tuning:
solving certain parameters algebraically for the controller based on the specified gain crossover frequency and the open-loop phase margin, the solving performed automatically,
optimizing remaining controller parameters, not solved algebraically, within a reduced search space, the optimizing performed automatically, and
producing a tuned controller having the certain and the remaining controller parameters, the tuned controller having characteristics that correspond to the user input; and
displaying a response for the tuned controller, the response indicating how the tuned controller operates with the linearized plant model when the linearized plant model is executing.

13. The media of claim 12, where the interactive tuning interface is used with a proportional integral derivative (PID) controller block in a Simulink model.

14. The media of claim 12, where the characteristics of the tuned controller satisfy a merit function.

15. The media of claim 12, where the tuning further includes one or more instructions for:
performing an optimization with respect to a parameter for the controller other than the certain parameters solved algebraically.

16. The media of claim 12, where the initiating the interactive tuning interface further comprises one or more instructions for:
displaying, for the tuned controller at least one of:
a rise time,
a settling time,
an overshoot,
a peak,
a gain margin,
a phase margin,
a maximum sensitivity,
a maximum complementary sensitivity, or
a closed-loop stability.

17. The media of claim 12, where the linearized plant model can be represented as a single input single output (SISO) loop.

18. The media of claim 12, further comprising one or more instructions for:

selecting an operating point for the arbitrary nonlinear model, the operating point indicating where:
the arbitrary nonlinear model is linearized, and
the linear plant model is designed,
where the tuned controller controls the arbitrary nonlinear model proximate to the operating point.

19. The media of claim 18, further comprising:
selecting a second operating point for the arbitrary nonlinear model;
producing a second tuned controller for controlling the arbitrary nonlinear model proximate to the second operating point; and
performing gain scheduling to schedule the tuned controller for the first operating point and the second tuned controller for the second operating point.

20. One or more non-transitory computer-readable media holding one or more executable instructions that, when executed on processing logic, tune gains for a controller having one, two, three or four parameters, the controller for controlling a nonlinear model, the media holding one or more instructions for:
linearizing at least a portion of the nonlinear model in an interactive free-form modeling environment, the linearizing producing a linear model that is valid over a certain region;
computing an open-loop frequency response of the linear model;
receiving an input for:
a desired gain crossover frequency for the open-loop frequency response, or
a desired phase margin at the desired gain crossover frequency of the open-loop frequency response; and
automatically tuning the gains using:
the open-loop frequency response, and
the received input,
where:
the automatic tuning achieves one or more desired performance goals, and
the automatic tuning is performed during a time interval that supports interactive design of the controller including display of at least one of the one or more desired performance goals and an actual performance of the controller.

21. A computer-implemented method for controlling an arbitrary nonlinear system model using a plant of any order, the method comprising:
interacting with the arbitrary nonlinear system model using an interactive controller;
linearizing, by processing logic, the system model;
producing the plant for use in the system model, the plant:
produced based on the linearized system model,
controlled by the interactive controller when the system model executes;
receiving a user input specifying characteristics for the interactive controller, the input including:
a gain crossover frequency, and
a phase margin,
where the input is received via a graphical user interface (GUI); and
tuning, by the processing logic, a controller associated with the interactive controller, the tuning performed automatically, the tuning including:
algebraically solving for at least two parameters of the controller and optimizing for remaining parameters of the controller.

22. An apparatus for controlling an arbitrary nonlinear system model using a plant of any order, the apparatus comprising:
means for interacting with the arbitrary nonlinear system model;
means for linearizing the system model;
means for producing the plant for use in the system model, the plant:
produced based on the linearizing means, and
controlled by an interactive controller means when the system model executes;
means for receiving a user input specifying characteristics for the interactive controller means, the input specifying:
a gain crossover frequency, and
a phase margin,
where the input is received via a user interface means; and
means for tuning a controller associated with the interactive controller means, the tuning performed automatically, the tuning including:
algebraically solving for at least two parameters of the controller and optimizing for remaining parameters of the controller.

23. A method for tuning a proportional integral derivative (PID) controller, the method comprising:
identifying a design objective for the PID controller, the design objective including:
a determined closed-loop stability, and
a determined robustness measure;
specifying a first value that represents a gain crossover frequency for an open-loop response;
specifying a second value that represents a phase margin for the open-loop response; and
adjusting, by processing logic, free parameters of the PID controller when the first value and the second value are specified, the adjusting tuning the PID controller so that the tuned PID controller satisfies the design objective.

24. The method of claim 23, where:
the first value ($\omega_c$) and the second value ($\theta_m$) are fixed parameters, and
the free parameters of the PID controller include $\alpha$ and $\beta$.

25. The method of claim 24, where the robustness measure includes:
an overshoot, a gain margin, or a merit function.

26. The method of claim 24, where the fixed parameters and the free parameters are used to express the PID controller in a continuous time expression represented as:

$$C(s) = \frac{\omega_c}{s}\left(\frac{\sin\varphi_z s + \omega_c \cos\varphi_z}{\omega_c}\right)\left(\frac{\sin\beta s + \omega_c \cos\beta}{\sin\alpha s + \omega_c \cos\alpha}\right)$$

or to express the PID controller in a discrete time expression represented as:

$$C(z) = \frac{2\sin\frac{\omega_c T_s}{2}}{z-1}\left(\frac{\sin\varphi_z z - \sin(\varphi_z - \omega_c T_s)}{\sin\omega_c T_s}\right)\left(\frac{\sin\beta z - \sin(\beta - \omega_c T_s)}{\sin\alpha z - \sin(\alpha - \omega_c T_s)}\right)$$

where the free parameters are determined algebraically from the continuous time expression.

27. A method for evaluating closed-loop stability of a proportional integral derivative (PID) controller design for a plant using an open-loop frequency response, the method comprising:

determining a value, where the value is an integer;
determining a plurality of gain and phase values of the plant over a frequency grid;
superimposing a contribution of the PID controller over the plurality of plant gain and plant phase values to determine an open-loop response, the open-loop response including a magnitude response and a phase response;
identifying gain crossover frequencies of the open-loop response;
determining, by processing logic, a corresponding phase angle at each of the identified open-loop gain crossover frequencies on the frequency grid;
determining, by the processing logic using the integer value, whether the phase angle at a lowest crossover frequency lies within an interval; and
determining that the phase angle at the other open-loop crossover frequencies satisfies a relationship and satisfies a phase margin value, where the relationship indicates that the phase angle at each of the other crossover frequencies does not substantially contribute to the closed-loop stability of the PID controller design.

28. The method of claim 27, where:
the integer value is r;
the frequency grid is represented as $\omega_G$;
the open-loop phase response is represented as $\phi(\omega)$;
the phase angle at the first crossover frequency is, $\phi_0$, and the interval can be represented as $[(2r-1)\pi+\theta_m, (2r+1)\pi-\theta_m]$;

the relationship can be represented as $\mu(\phi_{2k-1})=\mu(\phi_{2k})$ for k=1, ..., m; and
the phase margin is given by, $\theta_m$, and
the additional crossover frequencies can be represented as $\omega_1, \omega_2, \ldots, \omega_{2m-1}, \omega_{2m}$.

29. A method for evaluating closed-loop stability of a proportional integral derivative (PID) controller design, the method comprising:
identifying a first free parameter and a second free parameter of the PID controller design, the PID controller design including a first fixed parameter and a second fixed parameter;
identifying a plurality of values for the first free parameter;
identifying a plurality of values for the second free parameter;
gridding a range that includes one or more of the plurality values for the first free parameter and one or more of the plurality of values for the second free parameter, the gridding performed using a gridding technique;
identifying a constraint for use with the one or more of the plurality of values for the first free parameter and the second free parameter used with the gridding technique;
discarding values for the first free parameter and the second free parameter that violate the constraint or that fail to satisfy a Nyquist stability test;
evaluating, by processing logic, a merit function for pairs that include a value of the first free parameter and a value of the second free parameter that are not discarded and that satisfy the Nyquist stability test; and
selecting a pair of the merit function evaluated pairs that produces a smallest value of the merit function for a determined crossover frequency, where the crossover frequency is one of the first fixed parameter or the second fixed parameter.

30. The method of claim 29, where the first fixed parameter is a gain cross over frequency, $\omega_c$, and the second fixed parameter is a phase margin, $\theta_m$.

31. The method of claim 30, where the first free parameter is $\alpha$ and the second free parameter is $\beta$.

32. The method of claim 29, where the gridding is performed at determined increments using the gridding technique.

33. The method of claim 29, where the first free parameter is $\alpha$ and the second free parameter is $\beta$, and where the constraint determines a two-dimensional range and is represented as $0<\alpha<\beta<90$ and $\Delta\phi-90<\beta-\alpha$.

34. The method of claim 29, where the merit function involves a sensitivity function and a complimentary sensitivity function.

35. The method of claim 34, where the merit function is represented as:

$$F = \max_{\omega}\max(|S(j\omega)| - 2, |T(j\omega)| - T_{max}, T_{min} - |T(j\omega)|).$$

36. The method of claim 35, where the merit function has a lower bound specified as:

$$T_{min}(\omega) = \frac{1}{\max(1, \omega/(\omega_0/1.5))}$$

and where the merit function has an upper bound specified as:

$$T_{max}(\omega) = \frac{1}{\max(1, \omega/(1.5\omega_0))}.$$

37. The method of claim 36, further comprising:
modifying the crossover frequency when the smallest value of the merit function exceeds the upper bound.

38. A method for evaluating stability of a proportional integral derivative (PID) controller design, the method comprising:
identifying a first free parameter and a second free parameter of the PID controller design, the PID controller design including a first fixed parameter and a second fixed parameter;
identifying a plurality of values for the first free parameter;
identifying a plurality of values for the second free parameter;
searching a range that includes one or more of the plurality of values for the first free parameter and the second free parameter, the searching performed using an optimization technique;
identifying a constraint for use with the one or more of the plurality of values for the first free parameter and the second free parameter;
discarding values for the first free parameter and the second free parameter that violate the constraint or that fail to satisfy a Nyquist stability test;
evaluating, by processing logic, a merit function for pairs that include a value of the first free parameter and a value of the second free parameter that are not discarded and that satisfy the Nyquist stability test, the merit function operating in the optimization technique; and
selecting a pair of the merit function evaluated pairs that produces a smallest value of the merit function for a determined crossover frequency, where the crossover frequency is one of the first fixed parameter or the second fixed parameter.

39. The method of claim 38, where the first free parameter is α and the second free parameter is β.

40. The method of claim 39, where the merit function selects a value for α and β.

41. The method of claim 40, where α and β are used in the expression:

$$C(s) = \frac{\omega_c}{s}\left(\frac{\sin\varphi_z s + \omega_c \cos\varphi_z}{\omega_c}\right)\left(\frac{\sin\beta s + \omega_c \cos\beta}{\sin\alpha s + \omega_c \cos\alpha}\right)$$

or $$C(z) = \frac{2\sin\frac{\omega_c T_s}{2}}{z-1}\left(\frac{\sin\varphi_z z - \sin(\varphi_z - \omega_c T_s)}{\sin\omega_c T_s}\right)\left(\frac{\sin\beta z - \sin(\beta - \omega_c T_s)}{\sin\alpha z - \sin(\alpha - \omega_c T_s)}\right).$$

42. The method of claim 38, where the optimization technique includes:
a direct search technique or a gradient-descent technique.

\* \* \* \* \*

UNITED STATES PATENT AND TRADEMARK OFFICE
CERTIFICATE OF CORRECTION

| | | |
|---|---|---|
| PATENT NO. | : 8,467,888 B2 | Page 1 of 1 |
| APPLICATION NO. | : 12/604924 | |
| DATED | : June 18, 2013 | |
| INVENTOR(S) | : Pascal Gahinet et al. | |

It is certified that error appears in the above-identified patent and that said Letters Patent is hereby corrected as shown below:

In the Specification:

Col. 13, line 5-7 should read: "specifying a ~~HD~~ PID controller. In an embodiment, modeling environment"

Col. 21, line 8 should read: "the controller is ~~con figured~~ configured for controlling a nonlinear model."

In the Claims:

Col. 22, line 37 should read: "What is ~~claim~~ claimed is:"

Col. 23, line 43 should read: "7. The media of claim 6, where the arbitrary ~~non linear~~ non-linear"

Signed and Sealed this
Tenth Day of September, 2013

Teresa Stanek Rea
*Acting Director of the United States Patent and Trademark Office*